United States Patent
Bouzguarrou et al.

(10) Patent No.: US 12,288,067 B2
(45) Date of Patent: Apr. 29, 2025

(54) PREDICTION OF NUMBER OF ITERATIONS OF A FETCHING PROCESS

(71) Applicant: Arm Limited, Cambridge (GB)

(72) Inventors: Houdhaifa Bouzguarrou, Valbonne (FR); Thibaut Elie Lanois, Peymeinade (FR); Guillaume Bolbenes, Vallauris (FR)

(73) Assignee: Arm Limited, Cambridge (GB)

( * ) Notice: Subject to any disclaimer, the term of this patent is extended or adjusted under 35 U.S.C. 154(b) by 320 days.

(21) Appl. No.: 17/847,378

(22) Filed: Jun. 23, 2022

(65) Prior Publication Data

US 2023/0418611 A1    Dec. 28, 2023

(51) Int. Cl.
*G06F 9/30* (2018.01)
*G06F 9/32* (2018.01)
*G06F 9/38* (2018.01)

(52) U.S. Cl.
CPC ...... *G06F 9/30145* (2013.01); *G06F 9/30065* (2013.01); *G06F 9/325* (2013.01); *G06F 9/3802* (2013.01); *G06F 9/381* (2013.01); *G06F 9/3844* (2013.01)

(58) Field of Classification Search
None
See application file for complete search history.

(56) References Cited

U.S. PATENT DOCUMENTS

| | | | | |
|---|---|---|---|---|
| 5,740,419 A | * | 4/1998 | Potter | G06F 9/3863 |
| | | | | 712/E9.05 |
| 7,383,393 B2 | * | 6/2008 | Al Sukhni | G06F 12/0862 |
| | | | | 711/137 |
| 8,578,141 B2 | * | 11/2013 | Jarvis | G06F 9/3806 |
| | | | | 712/241 |

(Continued)

FOREIGN PATENT DOCUMENTS

EP    0821305 A2 *  1/1998  ............ G06F 9/32

OTHER PUBLICATIONS

'Loop Termination Prediction' by Timothy Sherwood et al., In Proceedings of the 3rd International Symposium on High Performance Computing (ISHPC2K), Oct. 2000. (Year: 2000).*

(Continued)

*Primary Examiner* — Steven G Snyder
(74) *Attorney, Agent, or Firm* — NIXON & VANDERHYE P.C.

(57) ABSTRACT

Prediction circuitry predicts a number of iterations of a fetching process to be performed to control fetching of data/instructions for processing operations that are predicted to be performed by processing circuitry. The processing circuitry can tolerate performing unnecessary iterations of the fetching process following an over-prediction of the number of iterations. In response to the processing circuitry resolving an actual number of iterations, the prediction circuitry adjusts the prediction state information used to predict the number of iterations, based on whether a first predicted number of iterations, predicted based on a first (Continued)

iteration prediction parameter, provides a good prediction (when the first predicted number of iterations is in a range i_cnt to i_cnt+N, where i_cnt is the actual number of iterations and N≥1), or a misprediction (when the first predicted number of iterations is outside the range i_cnt to i_cnt+N).

20 Claims, 13 Drawing Sheets

(56) References Cited

U.S. PATENT DOCUMENTS

| | | | | |
|---|---|---|---|---|
| 8,745,607 | B2* | 6/2014 | Valluri | G06F 8/452 |
| | | | | 717/160 |
| 9,619,290 | B2* | 4/2017 | Bailey | G06F 8/443 |
| 10,853,076 | B2* | 12/2020 | Bouzguarrou | G06F 9/3806 |
| 10,990,404 | B2* | 4/2021 | Bouzguarrou | G06F 9/3844 |
| 11,132,200 | B1* | 9/2021 | Chavan | G06F 9/381 |
| 11,693,666 | B2* | 7/2023 | Pusdesris | G06F 9/3844 |
| | | | | 712/208 |
| 11,803,390 | B1* | 10/2023 | Bouzguarrou | G06F 9/30072 |
| 2004/0044885 | A1* | 3/2004 | Zou | G06F 9/30043 |
| | | | | 712/E9.046 |
| 2004/0123075 | A1* | 6/2004 | Almog | G06F 9/3844 |
| | | | | 712/241 |
| 2006/0174090 | A1* | 8/2006 | Sartorius | G06F 9/3844 |
| | | | | 712/E9.056 |
| 2007/0101066 | A1* | 5/2007 | Al Sukhni | G06F 12/0862 |
| | | | | 711/137 |
| 2008/0072024 | A1* | 3/2008 | Davis | G06F 9/3848 |
| | | | | 712/239 |
| 2009/0172371 | A1* | 7/2009 | Joao | G06F 9/322 |
| | | | | 712/240 |
| 2012/0124344 | A1* | 5/2012 | Jarvis | G06F 9/325 |
| | | | | 712/230 |
| 2012/0166765 | A1* | 6/2012 | Gonion | G06F 9/3804 |
| | | | | 712/205 |
| 2016/0092230 | A1* | 3/2016 | Chen | G06F 9/30065 |
| | | | | 712/241 |
| 2016/0259667 | A1* | 9/2016 | Bailey | G06F 9/4893 |
| 2019/0258485 | A1* | 8/2019 | Bouzgarrou | G06F 9/3844 |
| 2020/0050458 | A1* | 2/2020 | Bouzguarrou | G06F 9/30065 |
| 2020/0089498 | A1* | 3/2020 | Annamalai | G06F 1/3296 |
| 2022/0283811 | A1* | 9/2022 | Al Sheikh | G06F 9/30065 |
| 2023/0120596 | A1* | 4/2023 | Pusdesris | G06F 9/3848 |
| | | | | 712/208 |
| 2023/0409325 | A1* | 12/2023 | Bolbenes | G06F 9/30036 |

OTHER PUBLICATIONS

'Improving Control Flow Prediction by Exploiting Loop Constructs' by P.J. Joseph et al., Jul. 17, 2000. (Year: 2000).*
Arm Limited, Proprietary Notice—CPYP, CPYM, CPYE, 2021, 8 pages.

* cited by examiner

PREDICTION OF NUMBER OF ITERATIONS OF A FETCHING PROCESS

BACKGROUND

Technical Field

The present technique relates to the field of data processing.

Technical Background

Sometimes, a processing apparatus may perform an iterative fetching process where a variable number of iterations of the fetching process are performed to control fetching of data or instructions to be used in processing operations performed by processing circuitry. It can be useful to predict, in advance of determining the actual number of iterations required, how many iterations may be needed, so that data or instructions can be fetched earlier than if the fetching process was not performed until the actual number of iterations was known.

SUMMARY

At least some examples of the present technique provide an apparatus comprising:
  processing circuitry to perform processing operations in response to decoded instructions; and
  prediction circuitry to predict, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations;
  in response to the processing circuitry resolving an actual number of iterations of the fetching process, the prediction circuitry is configured to adjust the prediction state information used to predict the number of iterations of the fetching process, based on whether a first predicted number of iterations, predicted based on a first iteration prediction parameter of the prediction state information, provides a good prediction or a misprediction;
  the prediction circuitry is configured to determine that the first predicted number provides the good prediction when the first predicted number of iterations is in a range i_cnt to i_cnt+N, where i_cnt is the actual number of iterations and N≥1; and
  the prediction circuitry is configured to determine that the first predicted number provides the misprediction when the first predicted number of iterations is outside the range i_cnt to i_cnt+N.

At least some examples of the present technique provide a method for an apparatus comprising processing circuitry to perform processing operations in response to decoded instructions, the method comprising:
  predicting, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations; and
  in response to the processing circuitry resolving an actual number of iterations of the fetching process, adjusting the prediction state information used to predict the number of iterations of the fetching process, based on whether a first predicted number of iterations, predicted based on a first iteration prediction parameter of the prediction state information, provides a good prediction or a misprediction;
  determining that the first predicted number provides the good prediction when the first predicted number of iterations is in a range i_cnt to i_cnt+N, where i_cnt is the actual number of iterations and N≥1; and
  determining that the first predicted number provides the misprediction when the first predicted number of iterations is outside the range i_cnt to i_cnt+N.

At least some examples of the present technique provide a non-transitory computer readable storage medium to store computer-readable code for fabrication of an apparatus comprising:
  processing circuitry to perform processing operations in response to decoded instructions; and
  prediction circuitry to predict, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations;
  in response to the processing circuitry resolving an actual number of iterations of the fetching process, the prediction circuitry is configured to adjust the prediction state information used to predict the number of iterations of the fetching process, based on whether a first predicted number of iterations, predicted based on a first iteration prediction parameter of the prediction state information, provides a good prediction or a misprediction;
  the prediction circuitry is configured to determine that the first predicted number provides the good prediction when the first predicted number of iterations is in a range i_cnt to i_cnt+N, where i_cnt is the actual number of iterations and N≥1; and
  the prediction circuitry is configured to determine that the first predicted number provides the misprediction when the first predicted number of iterations is outside the range i_cnt to i_cnt+N.

Further aspects, features and advantages of the present technique will be apparent from the following description of examples, which is to be read in conjunction with the accompanying drawings.

DESCRIPTION OF EXAMPLES

Figure 1:
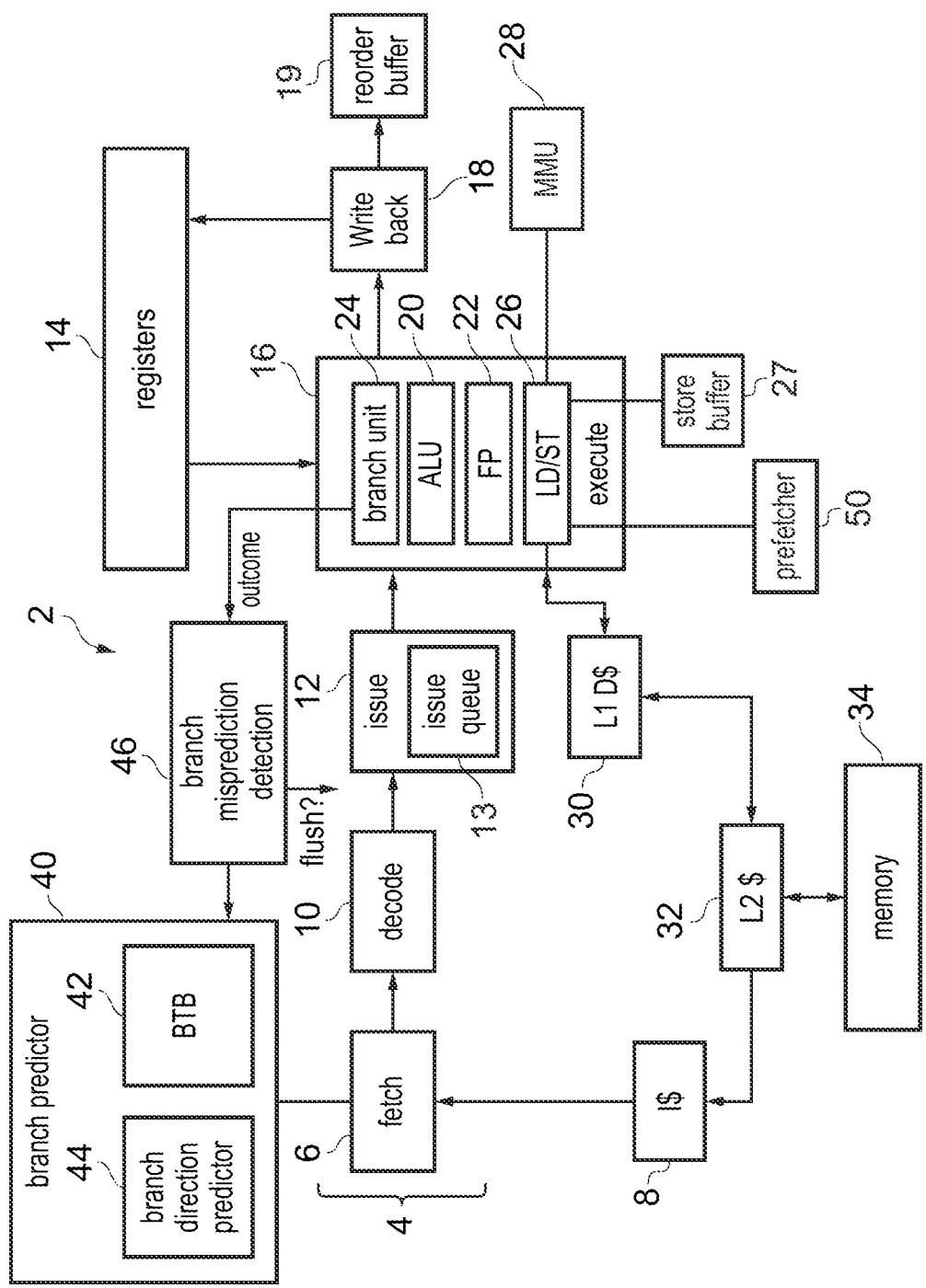
FIG. 1 schematically illustrates an example of a data processing apparatus.

An apparatus has processing circuitry to perform processing operations in response to decoded instructions; and prediction circuitry to predict, based on prediction state information, a number of iterations of a fetching process to be performed to control fetching of data or instructions to be used in processing operations that are predicted to be performed by the processing circuitry. The processing circuitry is capable of tolerating performing one or more unnecessary iterations of the fetching process following an over-prediction of the number of iterations, e.g. because performing the unnecessary iterations still gives a correct architectural result.

In response to the processing circuitry resolving an actual number of iterations of the fetching process, the prediction circuitry may use the actual number of iterations to adjust the prediction state information used to predict the number of iterations of the fetching process. In a typical prediction scheme, one would normally expect that the adjustment made when the actual outcome has been resolved should attempt to set the prediction state information so that future predictions will be as close to that actual outcome as possible. Hence, one might expect that any prediction which provides a predicted number of iterations other than the actual number of iterations should be treated as a misprediction.

However, the inventors recognised that, as the processing circuitry can tolerate performing at least one unnecessary iteration, and so there is no need to flush any incorrectly fetched data or instructions corresponding to the at least one unnecessary iteration, this provides an opportunity to use a more relaxed prediction mechanism which treats, as a good prediction, a first predicted number of iterations which is within a certain range starting at the actual number of iterations and extending by a certain number of iterations N beyond the actual number of iterations. A misprediction may then be detected if the predicted number of iterations is outside that range (either being fewer than the actual number, or being greater than N above the actual number). N is an integer greater than or equal to 1.

This recognises that over-predictions by a large number of iterations may affect performance even if they do not cause incorrect architectural results, so it may be desirable not to predict too far above the correct number of iterations, but nevertheless an over-prediction which leads to N unnecessary iterations or fewer being performed can be acceptable given that this can be tolerated by the processing circuitry.

Hence, in response to the processing circuitry resolving an actual number of iterations of the fetching process, the prediction circuitry adjusts the prediction state information used to predict the number of iterations of the fetching process, based on whether a first predicted number of iterations, predicted based on a first iteration prediction parameter of the prediction state information, provides a good prediction or a misprediction. The prediction circuitry determines that the first predicted number of iterations provides the good prediction when the first predicted number of iterations is in a range i_cnt to i_cnt+N, where i_cnt is the actual number of iterations and N≥1, and the prediction circuitry determines that the first predicted number provides the misprediction when the first predicted number of iterations is outside the range i_cnt to i_cnt+N.

By training the prediction state information to learn that anything within the range i_cnt to i_cnt+N can be considered a good enough prediction, this tends to cause the average of the predicted number of iterations determined for a sequence of predictions to be slightly higher than the average of the actual number of iterations i_cnt resolved for each prediction, so that there is greater tolerance against under-predictions. This can be useful for performance, because under-predictions can incur a more significant performance cost than over-predictions (under-predictions mean that a fetching iteration required for processing operations was not performed, causing at least a delay in performing remaining iterations once the actual number is resolved, and in some cases a flush penalty, while over-predictions merely fetch too many unnecessary iterations which can be tolerated by the processing circuitry as mentioned above). Also, training the prediction state based on predictions in the range i_cnt to i_cnt+N being considered a good enough prediction can allow a simpler prediction training scheme to be used, which does not need to provide as many updates to prediction state compared to a training scheme attempting to predict the actual number of iterations exactly.

In one example, the update made to the prediction state information (based on whether the first predicted number provides the good prediction or the misprediction) can be an updates of a confidence parameter which expresses a level of confidence in a prediction made using the first iteration prediction parameter. The confidence parameter can be used to determine whether to use the prediction indicated by the first iteration prediction parameter when controlling the fetching process. The prediction circuitry may increase a confidence associated with the first iteration prediction parameter when the first predicted number of iterations is determined to provide the good prediction, and decrease the confidence associated with the first iteration prediction parameter when the first predicted number of iterations is determined to provide the misprediction. Hence, even if the first predicted number of iterations differs from the actual number of iterations, but is greater than the actual number by less than N, this is considered good enough to warrant an increase in confidence. Confidence is decreased if there is an under-prediction of the number of iterations or an over-prediction by greater than N. By increasing confidence when the prediction is in the good enough range, this tends to train the predictions to make under-predictions less likely than in a precise prediction training scheme attempting to predict the actual number exactly.

It will be appreciated that the confidence parameter may express the level of confidence with different encodings. If the greatest level of confidence is encoded using the highest numeric value of the confidence parameter (with lower levels of confidence encoded using smaller numeric values), increasing the confidence may be performed by incrementing the confidence parameter by an increment amount, and decreasing the confidence may be performed by decrementing the confidence parameter by a decrement amount. On the other hand, if the greatest level of confidence is encoded using the lowest numeric value of the confidence parameter (with lower levels of confidence encoded using larger numeric values), increasing the confidence may be performed by decrementing the confidence parameter by an decrement amount, and decreasing the confidence may be performed by incrementing the confidence parameter by an increment amount.

For some outcomes of the prediction, the update made to the prediction state information based on whether the prediction is a good prediction or a misprediction can also update the first iteration prediction parameter itself, which indicates information used to determine the first predicted number of iterations.

For example, in response to a determination that the first predicted number of iterations provides the misprediction, the prediction circuitry may perform an adjustment operation for applying an adjustment to the first iteration prediction parameter, where:

for a misprediction where the first predicted number of iterations is below the range i_cnt to i_cnt+N, the adjustment is to increase a number of iterations indicated by the first iteration prediction parameter; and for a misprediction where the first predicted number of iterations is above the range i_cnt to i_cnt+N, the adjustment is to decrease a number of iterations indicated by the first iteration prediction parameter.

Such adjustments will tend to make it more likely that in future the first prediction number of iterations is in the good enough range i_cnt to i_cnt+N.

In some examples, the adjustment may be applied to the first iteration prediction parameter each time the adjustment operation is performed in response to identifying the misprediction.

However, for other examples, the adjustment operation performed when a misprediction is identified comprises:

determining whether a chance-dependent test, which has a given probability of providing a first outcome, provides the first outcome;

applying the adjustment to the first iteration prediction parameter in response to a determination that the chance-dependent test provides the first outcome; and suppressing applying the adjustment to the first iteration prediction parameter in response to a determination that the chance-dependent test provides another outcome other than the first outcome.

With this approach, a statistical adjustment to the first iteration prediction parameter is performed, where the adjustment (increase in the indicated number of iterations for under-predictions, decrease in the indicated number of iterations for over-predictions by greater than N iterations) is not always applied for every misprediction. Whether the adjustment is applied is determined based on the outcome of the chance-dependent test. If the first outcome occurs, the adjustment is applied. The adjustment is not applied if the chance-dependent test does not provide the first outcome. For example, the chance-dependent test can be any operation which can simulate a "dice roll" or other random/pseudo-random event which provides a given probability of providing the first outcome. Applying the adjustment statistically based on the chance-dependent test can give better average-case performance than applying the adjustment every time, because it reduces the chance that a few outlying training examples where the actual number of iterations is unusually high or low disrupt the state of the first iteration prediction parameter which may be providing good predictions for most other examples.

The probability of the first outcome occurring in the chance-dependent test can, if desired, be set to be different when the adjustment operation is to increase the number of iterations indicated by the first iteration prediction parameter on an under-prediction, compared to when the adjustment operation is to decrease the number of iterations following an over-prediction by more than N iterations greater than the actual number.

When the first predicted number of iterations provides a good prediction, it is not essential to perform any adjustment operation to adjust the first iteration prediction parameter. Nevertheless, the confidence associated with the first iteration prediction parameter could be increased as described above.

However, in some examples, in response to a determination that the first predicted number of iterations provides the good prediction and the first predicted number of iterations is in an upper portion of the range i_cnt to i_cnt+N, the prediction circuitry may perform an adjustment operation for applying an adjustment to the first iteration prediction parameter, where the adjustment is to decrease a number of iterations indicated by the first iteration prediction parameter. This tends to increase the likelihood that future predictions based on the first iteration prediction parameter will not be as far above the actual number i_cnt as this time, to reduce the number of unnecessary iterations that are processed—this helps to save power. Again, this adjustment operation could be a statistical adjustment which is selectively applied based on whether a chance-dependent test provides the first outcome, as described above. The probability of the chance-dependent test providing the first outcome could in some instances be different for the adjustment operation performed in response to a good prediction compared to the adjustment operation performed for the two cases described above (the under-predicting misprediction, and the over-predicting misprediction).

The boundary between the upper portion of the range i_cnt to i_cnt+N (for which predictions in that range trigger the adjustment operation for applying the adjustment to decrease the first iteration prediction parameter) and the lower portion of the range i_cnt to i_cnt+N (for which predictions in that range do not trigger the adjustment operation) can vary from implementation to implementation. Some examples may consider the boundary between the upper and lower portions to be halfway between i_cnt and i_cnt+N so that the adjustment operation to (in some cases statistically) apply the decrease adjustment to the first iteration prediction parameter is performed when the first predicted number of iterations is in the range i_cnt+N/2 to i_cnt+N. However, other examples may implement a different lower boundary of the upper portion of the range.

In some examples, the first iteration prediction parameter may indicate an average number of iterations for the fetching process. The average number may be determined across multiple instances of performing the iterative fetching process. It is not necessary for the average to be determined in an arithmetically precise manner (e.g. the average does not need to be an exact arithmetic mean of the number of iterations encountered for respective instances of performing the iterative fetching process). It can be sufficient that the average number tracks an intermediate number of iterations lying somewhere within the range of variation seen among the respective instances used to train the first iteration prediction parameter.

In some examples, the first iteration prediction parameter can be the only item of iteration-count-indicating prediction state information used to quantify the predicted number of iterations for the fetching process (there may also be some additional prediction state information, such as the confidence parameter, which is used to control the prediction but does not itself provide any information that would allow the predicted number of iterations to be quantified).

However, other examples may provide additional prediction state that can be used to quantify how many iterations to predict as the predicted number of iterations for which the fetching process is to be performed.

For example, the prediction circuitry may predict the number of iterations for the given instance of the fetching process based on the first iteration prediction parameter and a maximum iteration prediction parameter indicative of a maximum number of iterations for the fetching process. The prediction circuitry may select whether the first iteration prediction parameter or the maximum iteration prediction parameter is used to derive the prediction which is actually used to control the fetching process. As mentioned above, it can be useful, for robustness against the training being disrupted by outliers, to use a statistical approach where the first iteration prediction parameter is not always updated in response to mispredictions. Also, if the first iteration prediction parameter indicates an average number of iterations, that average may respond relatively slowly to updates when there is a sudden increase in the actual number of iterations seen for a sequence of instances of performing the iterative fetching process. If there are a number of instances of the iterative fetching process for which the actual number of iterations is suddenly higher than the current average, then in the period when the average is being retrained to take account of this increase, there may be a number of under-predictions which may negatively impact performance. Hence, while one might think that predicting based on the maximum number of iterations would risk unnecessarily over-predicting the number of iterations, providing the option of a prediction based on the maximum number of iterations can be useful to reduce the likelihood of under-predictions occurring for a period after a change in behaviour leading to an increase in the actual number of iterations.

The prediction circuitry may determine, based on a first confidence associated with the first iteration prediction parameter and a second confidence associated with the maximum iteration prediction parameter, whether to use the first iteration prediction parameter or the maximum iteration prediction parameter for determining the predicted number of iterations for the fetching process.

More particularly, the prediction circuitry may determine, in response to a determination that the first confidence is lower than a first confidence threshold or the second confidence is higher than a second confidence threshold, that the maximum iteration prediction parameter is to be used for determining the predicted number of iterations. Here, "lower" confidence means a confidence that is less confident than a "higher" confidence, irrespective of whether the confidence parameter encodes lower confidence using a greater or smaller numeric value than higher confidence. Hence, if the prediction circuitry has learnt that either the prediction based on the first iteration prediction parameter is not working well (so that the first confidence is lower than the first confidence threshold) or that a prediction based on the maximum iteration prediction parameter is working well (with confidence higher than a second confidence threshold), then the maximum prediction can be used as the actual prediction used to control fetching. Otherwise, the prediction based on the first iteration prediction parameter can be used to control fetching when the first confidence is greater than or equal to the first confidence threshold and the second confidence is less than or equal to the second confidence threshold.

Note that, regardless of whether the first iteration prediction parameter or the maximum iteration prediction parameter is actually used to control fetching, the adjustments made to the first iteration prediction parameter and related confidence as discussed above are still based on whether the prediction made using the first iteration prediction parameter was the good prediction or the misprediction. Hence, even if the maximum iteration prediction parameter is actually being used to control fetching, the update to the first iteration prediction parameter or its confidence is based on whether the first predicted number of iterations predicted based on the first iteration prediction parameter would have been good or a misprediction, even though that first predicted number was not used to control fetching. This is useful because the predictions based on the first iteration prediction parameter will on the majority of occasions provide a prediction which is more accurate and which leads to less wasted power due to processing unnecessary iterations, with the maximum iteration prediction parameter being used on the rarer occasions when a change in behaviour has meant that the use of the first iteration prediction parameter could risk under-predictions. It can be useful to continue updating the first iteration prediction parameter and/or its prediction confidence even when the maximum iteration prediction is being used so that future instances of predictions based on the first iteration prediction parameter can be improved.

In general, the maximum iteration prediction parameter may be updated by setting it to equal the actual number of iterations on an occasion when the actual number of iterations is determined to be higher than the maximum number of iterations previously indicated by the maximum iteration prediction parameter.

However, if the maximum iteration prediction parameter then retains its maximum value indefinitely, there is a risk that if the behaviour then switches towards lower iteration counts and the first predicted number of iterations becomes lower for a time, then the next time behaviour changes again and the actual number of iterations starts to creep up again to be higher than the first predicted number of iterations predicted based on the first iteration prediction parameter, using the maximum iteration prediction parameter to predict the number of iterations of the fetching process to be performed can risk performing an unnecessarily high number of iterations which may risk a reduction in power efficiency.

Therefore, in some cases it may be useful to provide a measure for ensuring that the maximum number of iterations indicated by the maximum iteration prediction parameter is not allowed to remain a large distance above the first predicted number of iterations indicated by the first iteration prediction parameter for too long a time. In practice, tracking the true maximum is most useful just after a sudden increase of the actual number of iterations across a sequence of training examples, but gradually over time the average indicated by the first iteration prediction parameter may start to catch up with the new behaviour, so it becomes less important for the maximum iteration prediction parameter to track the true maximum. If later on the observed behaviour tends back towards lower numbers of iterations, it can be useful to apply a corresponding reduction to the maximum number of iterations indicated by the maximum iteration prediction parameter, so that the next time the maximum iteration prediction parameter is used to control fetching, it is less likely to over-predict by a large number of unnecessary iterations.

Hence, it can be useful for the prediction circuitry to selectively apply, based on a difference between a number of iterations indicated by the maximum iteration prediction parameter and a number of iterations indicated by the first iteration prediction parameter, a reduction to at least one of: the maximum number of iterations indicated by the maximum iteration prediction parameter; and a confidence associated with the maximum iteration prediction parameter. The selective application of the reduction could be performed by using the difference between the number of iterations indicated by the maximum iteration prediction parameter and the first iteration prediction parameter to select whether to apply the reduction at all (for example, the reduction may be applied if the difference is greater than a threshold). Alternatively, the selective application of the reduction could be performed by varying the size of the reduction applied based on the difference between the number of iterations indicated by the maximum iteration prediction parameter and the first iteration prediction parameter. For example, the reduction size could be scaled by a factor depending on the difference so that the reduction is by a larger amount when the difference between the number of iterations indicated by the maximum iteration prediction parameter and the first iteration prediction parameter is higher than when the difference is lower. In general, this approach can tend to reduce the likelihood that, when the maximum iteration prediction parameter is used to control the fetching process, the prediction of the number of iterations will be vastly higher than the actual number of iterations.

A number of sets of prediction state information may be maintained for different prediction instances, each prediction instance corresponding to a different instance of the iterative fetching process. Hence, information for the current example (e.g. an address of a corresponding point in program flow at which the fetching process is to be performed) can be used to look up the table of prediction state to identify the prediction state information for that example. Each set of prediction state information may for example include the first iteration prediction parameter, and if provided the maximum iteration prediction parameter, as well as any associated confidence values as mentioned above.

In one example, the prediction circuitry may perform a history-dependent lookup in a history-dependent table of prediction state information based on history-dependent lookup information depending at least on an address associated with a given instance of the fetching process and history information indicative of a history of program flow. In response to determining that a hit entry of the history-dependent table corresponds to the history-dependent lookup information, the prediction circuitry may predict the number of iterations for the given instance of the fetching process based on the prediction state information in the hit entry of the history-dependent table, the hit entry comprising at least the first iteration prediction parameter (and optionally also comprising the maximum iteration prediction parameter mentioned earlier). Using information about a history of program flow (such as a sequence of branch outcomes for branches preceding the current point of program flow) to look up prediction state can improve prediction accuracy because an instance of the fetching process associated with a given address may require different numbers of iterations of the fetching process depending on operands resulting from earlier instructions. By considering program flow history information in the lookup, separate prediction state entries can be looked up for the fetching process at a given address when encountered after different histories of program flow, and so on a subsequent lookup the history can be used to distinguish which prediction entry to use, making it more likely that the predicted number of iterations is a good prediction for the current scenario in which the fetching process is needed.

However, the history-dependent lookup may not always provide a performance benefit, as some instances of the fetching process may have consistent behaviour regardless of the earlier history of program flow, in which case the additional energy consumed in performing a history-dependent lookup may be unnecessary. Hence, in some examples the prediction circuitry may perform a history-independent lookup in a history-independent table of prediction state information based on history-independent lookup information depending on the address associated with the given instance of the fetching process. In response to determining that a hit entry of the history-independent table corresponds to the history-independent lookup information, the prediction circuitry may determine based on hint information specified by the hit entry of history-independent table whether to predict the number of iterations based on the prediction state information based on the history-dependent lookup of the history-dependent table or based on the history-dependent lookup of the history-dependent table. The history-dependent lookup of the history-dependent table can be suppressed if the hint information in the hit entry of the history-independent table indicates that it is not necessary to lookup the history-dependent table. This can help save power by restricting the cases in which the history-dependent table is looked up to those instances of the fetching process for which the history-dependent lookup is predicted to provide a performance benefit.

The hint information can be set based on observation of previous predictions. For example, the prediction circuitry may set the hint information associated with the given instance of the fetching process, based on at least one of:

a frequency of mispredictions of the number of iterations determined based on the history-independent table for the given instance of the fetching process. For example, hard-to-predict cases which generate frequent mispredictions using the history-independent table may be predicted to be cases where the preceding program flow affects the number of iterations required, so that a history-dependent lookup can be beneficial.

whether a difference between a maximum number of iterations encountered for the given instance of the fetching process and the actual number of iterations resolved by the processing circuitry for the given instance of the fetching process is greater than N. If the difference between the maximum number of iterations on the actual number of iterations is greater than N, then the dynamic range in the number of iterations experienced for the given instance of the fetching process at a given address may be higher than is desired to be tolerated in terms of processing of unnecessary iterations by the processing circuitry, so that it is expected that a relatively large number of mispredictions would occur where the first predicted number of iterations is outside the good enough range i_cnt to i_cnt+N. Again, this can be a scenario where use of history-dependent lookups can be predicted to give better performance, as the history information may help to divide the instances which require iteration counts in different ranges into subsets allocated different entries of the history-dependent table, where each subset can be predicted with a smaller dynamic range in iteration counts, reducing the number of unnecessary iterations fetched.

While the combination of a history-independent table and history-dependent table as described above can be beneficial, allowing the simpler history-independent table to be used for most predictions but the history-dependent table to provide more precise predictions for cases where the actual number of iterations depends on the history of program flow, this is not the only approach.

Other examples may provide only one of the history-independent table and history-dependent table, and so may use either a history-independent lookup for all predictions or a history-dependent lookup full predictions. Hence, it is not essential to provide both types of table.

The prediction scheme described above can be useful for any fetching process which has the property that the processing circuitry can tolerate over-predictions that cause too many iterations of the fetching process being performed.

One example of such a fetching process is where the fetching process comprises fetching one or more iterations of at least one instruction to be decoded for processing by the processing circuitry, where each iteration is predicted to correspond to an instance of a predicated-loop-terminating branch instruction for controlling, based on whether a loop termination condition is satisfied, whether the processing circuitry should process a further iteration of a predicated loop body or process a following instruction to be processed after a final iteration of the predicated loop body. If at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an architectural effect of the at least one unnecessary iteration of the predicated loop body. The techniques discussed above can be particularly useful for such an example because it can be relatively hard to predict exactly the number of iterations of the loop required, and the flush penalty on under-predictions may be high. The prediction update scheme discussed above can have a wider range of tolerance where anything in the range i_cnt to i_cnt+N can be tolerated, recognizing that additional unnecessary iterations can be tolerated because of the predication applied to the predicated loop body.

With the example of controlling fetching for a loop comprising the predicated-loop-terminating branch instruction, if the misprediction in the number of iterations is an under-prediction, so that too few iterations were fetched, then a flush may be performed because the next instructions after the loop may already have been fetched which may cause incorrect architectural results if their outcomes would have changed based on the extra loop iterations that should have been fetched but were not fetched due to the under-prediction. Hence, for an under-predicting misprediction (where the fetched number of iterations was less than the actual number), a flush of instructions from the pipeline may be triggered. For an over-prediction, where too many iterations were fetched, it is not necessary to trigger a flush, as predication means the unnecessary iterations can be processed anyway without causing incorrect architectural results. However, there may be a limit to how many iterations of the loop may already have been fetched by the time the actual number of loop iterations is identified (the actual number of iterations may be resolvable by the processing circuitry based on operands of the first iteration of the loop).

Hence, in some examples, N can correspond (at least approximately) with the maximum number of iterations that can have been fetched already by the time the actual number of loop iterations is resolved, because once the actual number of loop iterations is resolved there is no longer a need to use any prediction and any remaining loop iterations can be fetched non-speculatively—hence there may be limited value in making a prediction that is larger than the actual number by more than N. N may depend on the depth of the processing pipeline used—a deeper pipeline may have fetched more iterations by the time the actual number of iterations has been resolved.

Another approach can be that, following the mispredicted-non-termination branch misprediction, the processing circuitry may:

flush the at least one unnecessary iteration in response to a determination that a number of unnecessary iterations fetched for processing by the processing circuitry is greater than N;

and suppress flushing the at least one unnecessary iteration in response to a determination that the number of unnecessary iterations fetched for processing by the processing circuitry is less than or equal to N.

In this case, N is the number of unnecessary iterations that the processing circuitry can tolerate without performing a flush. If there are more than N unnecessary iterations performed, then a flush is performed as a flush can be faster than waiting for the over-predicted iterations to drain from the pipeline.

Nevertheless, other examples may set N in a different manner. N may be a design parameter of the prediction training algorithm which can vary from one implementation to another, depending on design choice.

The technique described above can be particularly useful where the predicated loop body associated with the predicated-loop-terminating branch instruction comprises operations to:

determine a variable number of bytes to be processed in a current iteration;

perform at least one processing operation based on the variable number of bytes determined for the current iteration, the at least one processing operation including at least one of a load operation and a store operation; and update, based on the variable number of bytes, a remaining bytes parameter indicative of a remaining number of bytes to be processed.

The number of iterations for such a loop body can be particularly hard to predict because the variable number of bytes to be processed in the loop as a whole may depend on at least one operand of the first iteration of the loop, which may be extremely variable for different instances of executing the same loop because it can be common for a function comprising such a loop body to be called from a number of different locations in program flow, where each instance may use different input operands. Hence, a reasonable number of mispredictions may be expected to arise for such a loop which processes a variable number of bytes of data loaded/stored from/to memory. Treating as good enough predictions a prediction in the range i_cnt to i_cnt+N can skew average predictions slightly above the average of the true iteration counts to provide more robustness against under-prediction.

For such a predicated loop body involving the processing of a variable number of bytes, the loop termination condition for a given iteration of the predicated-loop-terminating branch instruction may be considered satisfied when the remaining bytes parameter indicates that the number of remaining bytes to be processed is zero. However, whether the loop termination condition is satisfied for any remaining iteration of the loop may be resolved based on the operands of the first loop iteration. Therefore, it is not necessary to actually wait for a subsequent loop iteration to reach the processing stage before determining whether the loop termination condition will be satisfied for that loop iteration. The point at which the loop terminates can be resolved when the first loop iteration is processed, and any prediction state updates (and flush if required) can be triggered in response to the processing of the first loop iteration even if that first loop iteration was predicted correctly and the mispredicted iteration has not yet reached the execute stage of the processing circuitry.

For some loop bodies of the type that processes a variable amount of data as discussed above, the variable number of bytes to be processed in the current iteration is dependent on alignment of a target address of the load and/or store operation with respect to an alignment boundary. Loops of this type, which step through processing a block of data chunk by chunk in a number of iterations, can be much less efficient if each iteration of the loop starts processing data from an unaligned address (an address not aligned to a multiple of a natural transfer size supported by the memory system). This is because the memory system may split an unaligned memory access into multiple accesses performed separately to portions of data either side of the address at the alignment boundary. Therefore, if the initial address operands for the first iteration the loop indicate an unaligned address, it can be useful to insert an additional partial loop iteration which does not process the maximum amount of data supported per loop iteration, but processes a smaller amount allowing the next iteration to start at an aligned address which is aligned to the alignment boundary. This means that the total number of iterations required may depend on the alignment of the input address, which is not typically known until relatively late in the processing pipeline, making it harder for the prediction circuitry to predict the required number of iterations. For this type of loop, the techniques discussed above can be particularly useful.

In particular, depending on alignment, some implementations may sometimes require one or two more iterations than if the same amount of data was processed based on aligned address operands. In that case, to provide greater tolerance for additional partial loop iterations being performed, it can be useful to have N greater than or equal to 2.

In some examples, the predicated-loop-terminating branch instruction is a combined instruction for controlling the processing circuitry to perform both the predicated loop body and a conditional branch operation conditional on whether the loop termination condition is satisfied. Hence, in response to a single instruction, decode circuitry can generate one or more micro-operations required for the processing circuitry to implement the loop body as well as controlling any branching back to the same instruction to implement a further iteration of the loop.

For other examples, the predicated-loop-terminating branch instruction may be separate from one or more instructions for controlling the processing circuitry to perform the loop body. In this case, the compiler may generate machine code which has one or more functional instructions to perform the loop body itself and a branch instruction (which may either precede or follow the loop body) to evaluate the loop termination condition and determine whether to continue processing a further iteration of the loop (if the branch precedes the loop body, there may be a further unconditional branch at the end of the loop body to branch back to the loop terminating branch or other instruction marking the start of the loop).

Regardless of whether the predicated-loop-terminating branch instruction is combined with the loop body or separate, the prediction circuitry may train, based on observation of past instructions executed by the processing circuitry, which addresses in the program flow correspond to a predicated-loop-terminating branch instruction, and may train the number of loop iterations associated with particular instances of that instruction, based on the scheme described above where the first iteration prediction parameter is updated based on whether it provides a good prediction in the range i_cnt to i_cnt+N or a misprediction outside that range.

The techniques discussed above can be particularly useful in loops which implement certain string processing library functions defined in the string.h header file of the C programming language. String.h is a library which provides a certain group of functions for manipulating strings stored in memory, where a string is a sequence of text characters. These functions can include memcpy (a function to copy a string from one region of memory to another), memcmp (a function to compare two strings), strchr (a function to search for the first occurrence of a specified character within a given string loaded from memory), strlen (a function to determine the length of a specified string variable, e.g. by searching for the first byte equal to 0 after a particular address in memory), and so on. Such functions can seem apparently simple to the software developer, but can be relatively performance intensive when compiled into the machine code which will actually be executed by the processor. In the compiled code, these functions may be implemented by using a loop body processing a variable number of bytes per iteration (e.g. dependent on a size specified for the loop as a whole and/or on address alignment), similar to the one discussed above. In some software applications, a relatively large fraction of processing time can be taken up by such string processing functions. As each instance of calling the string.h processing function may lead to multiple iterations of the predicated loop body being performed and each iteration of the predicated loop body may be associated with a predicated-loop-terminating branch instruction, and the same processing function may be called from many different locations in the program with different operands depending on the other operations performed before the function call, such software applications may be extremely prone to loss of performance caused by mispredictions of the number of iterations of micro-operations required to be processed by the processing circuitry. The techniques discussed above can help reduce the frequency with which flushes are needed for such loops, by training the predictions to aim for a range i_cnt to i_cnt+N above the actual number of iterations i_cnt. Hence, it can be particularly useful for the predicated loop body to comprises operations to implement a string.h C library function.

One particular example of a string.h library function for which this technique can be particularly useful is the memcpy function, which copies a variable number of bytes of data from first memory region to a second memory region. Memcpy operations are very common in some software applications, and can be slow to process as they can involve iteration of load operations to load bytes of data from memory and dependent store operations to store the loaded bytes to a different region of memory. The loop executed for the memcpy operation can be a relatively tight loop for which the penalty caused by load/store delays and branch mispredictions can be high. By using the techniques discussed above, average case performance can be improved for the memcpy operations, which can be expected to provide a reasonable performance benefit given the frequency of such operations in typical workloads. Hence, it can be particularly useful to use the techniques described above when the one or more micro-operations supplied for each loop iteration comprise micro-operations to control the processing circuitry to perform a memory copy operation to copy data from a first memory region to a second memory region.

However, the predicated loop example above is not the only example of a fetching process for which the prediction training scheme described above can be useful.

In another example, the prediction circuitry comprises prefetch prediction circuitry to perform a prefetch prediction to predict, as the number of iterations, a number of blocks of data or instructions to be prefetched from memory into a storage structure (e.g. a cache) associated with the processing circuitry and, based on the prefetch prediction, to perform, as the fetching process, a number of iterations of prefetching. When prefetching blocks of data or instructions into a cache, over-prediction of the number of blocks to be prefetched can be tolerated since there is no adverse architectural effect if a prefetched block is not subsequently accessed based on a memory access requested by the processing circuitry. The performance penalty on an under-prediction of the number of books to be prefetched may be greater than on an over-prediction because the under-prediction leads to extra cache misses for the stream of accesses being predicted by the prefetch prediction circuitry. Hence, based on analysis of which of the prefetched addresses are subsequently accessed by demand access requests, once the actual number of iterations has been resolved, the prediction may be treated as a good prediction if the actual number is in the range i_cnt to i_cnt+N and a misprediction otherwise. Again, providing some tolerance in the range for which the prediction training scheme aims to set the prediction state can be helpful to reduce probability of under-prediction.

Example Processing Apparatus

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for queueing micro-operations in an issue queue 13 and checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included, e.g. between the decode stage 10 and issue stage 12, for mapping architectural registers specified by program instructions or micro-operations to physical register specifiers identifying physical registers in the register file 14. Also, for an out-of-order processor, the writeback stage 18 may use a reorder buffer 19 to track completion of instructions executed out-of-order.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. Pending store operations for which issuing of store requests to the memory system is awaited may be tracked in a store buffer 27. A memory management unit (MMU) 28 is provided to perform memory management operations such as address translation and checking of memory access permissions. The address translation mappings and access permissions may be defined in page table structures stored in the memory system. Information from the page table structures can be cached in a translation lookaside buffer (TLB) provided in the MMU 28.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness. The fetch stage 6 and decode stage 10 may be considered as an example of front end circuitry for supplying micro-operations for processing by the execute stage 16. The execute stage 16 is an example of processing circuitry for processing the micro-operations.

As shown in FIG. 1, the apparatus 2 includes a branch predictor 40 for predicting outcomes of branch instructions. The branch predictor is looked up based on addresses of instructions to be fetched by the fetch stage 6 and provides a prediction of whether those instructions are predicted to include branch instructions, and for any predicted branch instructions, a prediction of their branch properties such as a branch type, branch target address and branch direction (the branch direction indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Branch misprediction detection circuitry 46 detects, based on outcomes of branch instructions executed by the branch unit 24, whether a branch has been mispredicted, and controls the pipeline 4 to suppress effects of the mispredicted branch instruction and cause execution of instructions to resume based on the correct branch outcome (e.g. by flushing operations that are younger than the branch in program order and resuming fetching from the instruction that should be executed after the branch). The prediction state data in the BTB 42 and branch direction predictor 44 is trained based on the outcomes of executed branch instructions detected by branch misprediction detection circuitry 46.

A data prefetcher 50 may be provided for predicting addresses of data expected to be accessed in response to future load/store instructions processed by the load/store unit 26. The prefetcher 50 can issue prefetch requests requesting that the data for the predicted addresses is prefetched to the cache 30, 32. The prefetch predictions can be based on monitoring of previously accessed addresses specified for load/store instructions handled by the load/store unit 26. Prefetching can help improve performance by increasing cache hit rates in the cache 30, 32.

Predicated Loop Example (Memory Copy)

Figure 2:
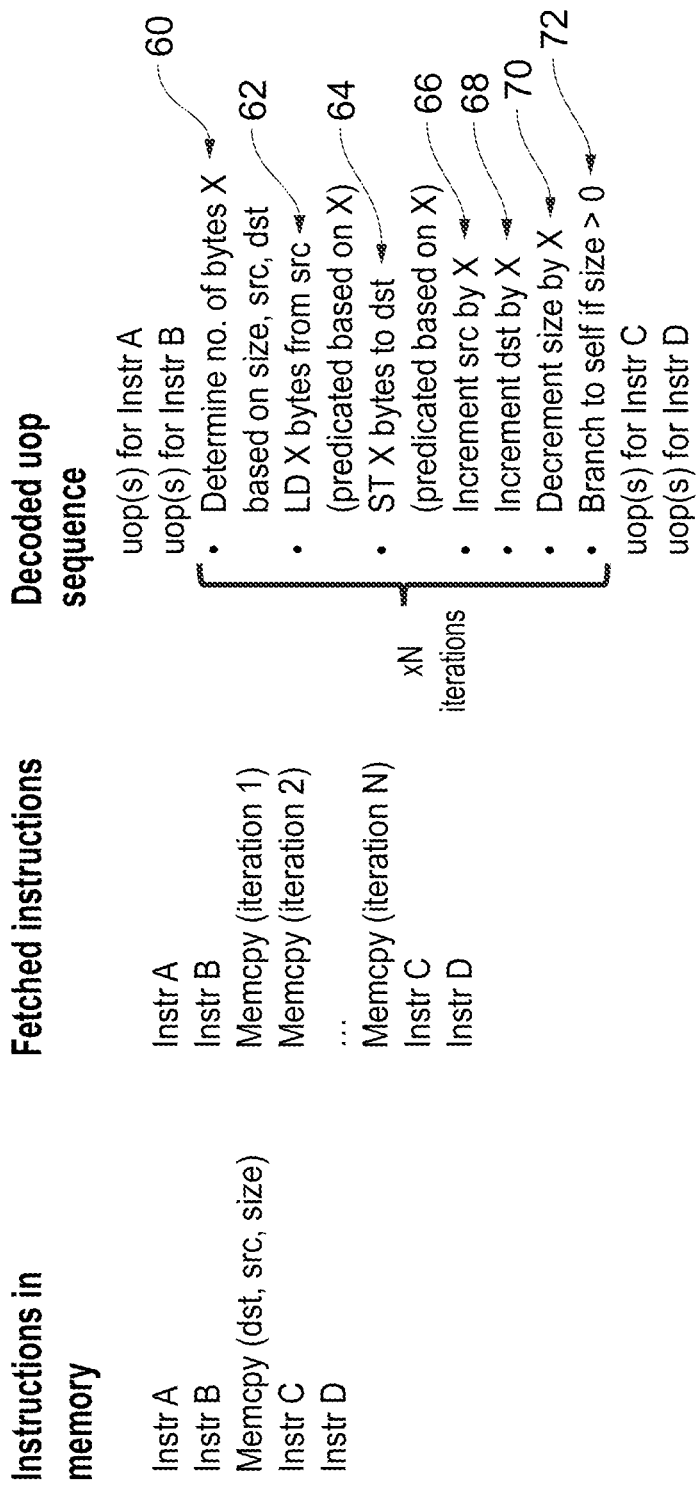
FIG. 2 illustrates an example of executing code including a memory copy (memcpy) instruction.

FIG. 2 illustrates processing of a memory copy instruction for copying data from a first memory region to a second memory region. The memory copy instruction is a particular example of a predicated-loop-body instruction. In this example, the memory copy instruction also serves as a predicated-loop-terminating branch instruction.

The memory copy instruction specifies a source address src identifying a first region of memory and a destination address dst identifying a second region of memory, as well as specifying a size parameter which identifies the number of bytes of data to be copied from the first region of memory to the second region of memory. Any addressing mode may be used to identify the address operands (e.g. using an absolute address, or as a relative address specified using an operand defining an offset, which could be specified relative to a base address stored in a register 14 or relative to an instruction address of the memcpy instruction itself). The left-hand portion of FIG. 2 shows a sequence of program instructions as they would be stored in memory prior to being fetched by the fetch stage 6. A single instance of the memory copy instruction is included surrounded by a certain number of other instructions A, B, C, D.

Although the size parameter of the memory copy instruction may specify a certain total number of bytes to be copied, that size may be greater than the maximum number of bytes that can be copied in a single instance of executing the memory copy instruction, and so the memory copy instruction may be interpreted as an implicit branch instruction which, if the number of bytes copied in response to a particular instance of the memory copy instruction is such that there are still some bytes remaining of the total number of bytes to be copied, then the memory copy instruction triggers a branch to itself, so that a further instance of the memory copy instruction is executed to represent a further iteration of a predicated loop (the size parameter can be decremented by the number of bytes processed on each iteration of the memory copy instruction to track how many bytes remain to be processed, and the source/destination addresses of the memory copy instruction can be incremented by the number of bytes processed so that each iteration of the memory copy instruction moves onto the next chunk of data in memory after the chunk processed in the previous iteration).

The branch predictor 40 can predict how many iterations of the memory copy instruction will be required before the loop terminates, so that it can control the fetch stage 6 to fetch the memory copy instruction the predicted number of times before moving onto the next instruction after the memory copy instruction. For example, the branch predictor 40 can use prediction state information stored in the BTB 42 or branch direction predictor 44, or prediction state information stored in a separate structure to the prediction structures 42, 44 used for predicting regular branches, to detect whether the loop should be terminated at a given iteration of the loop. If the number of iterations of the memory copy instruction is mispredicted, the branch misprediction detection circuitry 46 may (sometimes) trigger a flush of incorrectly scheduled micro-operations which should no longer be executed, and control the pipeline 4 to resume fetching operations from after the mispredicted branch, including fetching more instances of the memory copy instructions if required.

Hence, the middle portion of FIG. 2 shows the fetched sequence of instructions fetched by the fetch stage 6 when the program instructions stored in memory are executed. Note that, in the fetched instruction sequence as shown in the middle portion of FIG. 2, all of the instances of the memory copy instruction shown are actually different fetched instances of the same instruction fetched from the same instruction address, where the branch predictor 40 has predicted that N iterations of the loop will be needed before the loop termination condition occurs (which in this case is when the size parameter indicates that the number of remaining bytes to be processed has reached zero).

The right-hand portion of FIG. 2 illustrates a decoded sequence of micro-operations generated by the decode stage 10 corresponding to the fetched instruction sequence shown in the middle part of FIG. 2. For a given instance of fetching the memory copy instruction for a particular iteration of the memory copy loop, that instance of the memory copy instruction is mapped by the decode stage 10 to a group of multiple micro-operations 60-72 which collectively implement a single iteration of the memory copy loop. Hence, in the example shown in FIG. 2 where N iterations of the memory copy loop are required, there will be N sets of the group of micro-operations 60-72 illustrated with the bracket (FIG. 2 only shows one iteration of these micro-operations for conciseness).

The micro-operations generated for a particular iteration of the memory copy loop include at least one micro-operation 60 to determine a variable number of bytes X based on the size parameter, the source address and/or the destination address (while FIG. 2 shows a single micro-operation 60, other implementations may need more than one micro-operation to assess the addresses and calculate the number of bytes). The number of bytes X may be selected so as to not exceed the number of bytes indicated by the size parameter, which may indicate a maximum number of bytes allowed to be copied in response to the current iteration of the memory copy loop. However, the micro-architecture of the processing circuitry 16 may have the flexibility to vary the number of bytes X selected, depending on micro-architectural implementation choice. In general, the particular value selected for X can vary from implementation to implementation (e.g. some implementations may support a greater maximum size for X than others) and between different iterations of the memory copy loop, even when all the operands (destination address, source address, size) are the same. This flexibility is possible because the update made to the size parameter and source/destination memory addresses in response to the current iteration of the predicated loop will account for the number of bytes that have actually been copied and then this will cause the operation of subsequent iterations of the memory copy loop to be adjusted accordingly so that the overall effect of the loop as a whole can be the same even if the particular number of bytes processed in a particular iteration varies.

For example, the variable number of bytes X could be determined based on the alignment of the source address and/or the destination address with respect to an address alignment boundary. The memory system 34 may be able to handle memory accesses more efficiently if a request is made specifying an address which is aligned to an address alignment boundary than when an unaligned access to a block of data which spans an address alignment boundary is requested. This is because some internal control mechanisms of the memory system, such as control logic and queues associated with a cache, interconnect or memory controller, may assume that requests specify an address aligned to an address boundary corresponding to an address block of a certain size such as a certain power of 2 number of bytes, and so if a block of data crossing such an address alignment boundary has to be accessed, then the load/store circuitry 26 may split the memory access into a number of separate requests each specifying a portion of data which does not cross the address alignment boundary.

For the memory copy loop, if the source/destination address is unaligned for the first iteration of the memory copy loop, and each iteration selects as the number of bytes X the maximum possible number of bytes that can be processed in one iteration, the source/destination address after the update performed in that iteration may still be unaligned, so the next iteration would then also make an unaligned access. Hence, if each iteration requires an unaligned access, this may increase the overall number of requests that need to be made the memory system because on each iteration of the memory copy loop an access to an unaligned block may require multiple separate memory access requests to be issued to memory. In contrast, if most iterations of the memory copy instruction can perform an aligned access then this may only require one memory access request to be issued per iteration, which can reduce the total amount of memory bandwidth consumed by the accesses to memory and hence improve performance.

Therefore, it can be useful on the first iteration of the memory copy loop, if the source address or destination address is unaligned, to select the variable number of bytes X so that, even if the hardware would be capable of handling an access to a greater number of bytes in the current iteration, X is selected so that for a subsequent iteration of the memory copy loop at least one of the source address and the destination address becomes an aligned address aligned to an address alignment boundary. For example, X may be selected based on the difference between the source address and the address representing the next address alignment boundary after the source address, or based on the difference between the destination address and the address representing the next address alignment boundary after the destination address. In cases where the alignment of the source address relative to an address alignment boundary is different compared to the alignment of the destination address relative to an address alignment boundary, it may not be possible to align both the source and destination addresses to the alignment boundary for the next iteration of the memory copy loop, and so in that case some implementations may choose to prioritise the load alignment and other implementations may choose to prioritise the store alignment.

Figure 3:
FIG. 3 illustrates an example of a predicated load micro-operation.

Also, the micro-operations generated for a particular memory copy instruction iteration include a predicated vector load micro-operation 62 which loads a destination vector register with at least X bytes of data obtained from memory system locations identified based on the source address src. FIG. 3 illustrates an example of the predicated vector load micro-operation 62. The destination register of the load micro-operation comprises a number of vector elements (e.g. 8 vector elements V[0] to V[7] in this particular example), and the source address src (assumed to be equal to #A in this example) identifies the data to be loaded to the first of the vector elements, V[0], with the subsequent vector elements being loaded with data associated with addresses which are generated by applying successive address increments to the address #A specified by the source address parameter. In this example, the increment between the addresses associated with two adjacent vector elements is 1 byte, but it would also be possible for predicates to be applied at a granularity larger than 1 byte. The predicate operand specifies which vector elements are active and which vector elements are inactive. For example, the predicate can be represented as a mask for which bit values equal to 1 indicate the positions of the active vector elements in the destination register and bit values equal to 0 indicate the positions of the inactive vector elements. In this example, the first five elements of the vector are active and the remaining three elements are inactive, indicating that vector elements V[5] to V[7] should have the corresponding load operations suppressed. Hence, if the micro-operation had determined that the number of bytes X to load equals 5 then the predicate could be generated as shown in FIG. 3 to indicate that 5 bytes of data should be loaded to the first five elements of the vector.

As shown in FIG. 2, the set of micro-operations generated for a given memory copy instruction also includes a predicated vector store micro-operation 64 which stores the variable number X of bytes from a source register (which can be specified to match the destination register used by the load micro-operation 62) to memory system locations identified based on the destination address (again, the address corresponding to each vector element of the source vector register can be identified based on applying address increments to the destination address). Similar to the load micro-operation shown in FIG. 3, a predicate operand can be generated to predicate the store operations and ensure that the data from active elements of the store source register are saved to memory while store operations are suppressed for the inactive vector elements. The number of active elements indicated by the predicate operand may be determined based on the number of bytes X determined by micro-operation 60. The store micro-operation 64 may share the same predicate operand as the load micro-operation 62.

Hence, the combination of the load micro-operation 62 and the store micro-operation 64 can implement the required memory copy operation to copy X bytes of data from the source memory region to the destination memory region. The loop of decoded micro-operations then includes a number of micro-operations for maintaining the address and size parameters of the memory copy instruction to account for the number of bytes of data which have already been processed. Micro-operations 66, 68 increment the source address and the destination address respectively by X, the copied number of bytes, so that the source and destination addresses for a subsequent iteration of the memory copy loop will be advanced in memory by X bytes. Also, micro-operation 70 is generated which causes the size parameter of the memory copy instruction to be decremented by X, so that the number of bytes of data remaining to be copied can be indicated to be X bytes fewer than was the case for the current iteration.

The set of micro-operations for a given instance of the memory copy instruction also includes a branch micro-operation 72 which performs a conditional branch to the instruction address of the memory copy instruction itself, with the branch being taken if the size parameter after the update performed by micro-operation 70 is greater than 0 and the branch being not taken if the size parameter is 0. That is, this branch is conditional on whether the loop termination condition for the loop is satisfied. Although not shown in FIG. 2 for conciseness, in some instruction set architectures there may also be a need for an intervening compare instruction between micro-operation 70, 72 to compare the size parameter with 0 and set a condition status flag accordingly, which the branch micro-operation 72 can used to determine whether to take the branch.

Hence, each iteration of the memory copy loop may perform the memory copy operation for a certain number of bytes X which is limited, as a maximum, to the number of bytes indicated by the size parameter but is allowed to be smaller, and then the determined number of bytes are copied from source region of memory to a destination region of memory and the addresses and size parameter are updated accordingly and if it is still necessary to perform a further iteration of the loop because there is at least one remaining bytes to be copied then a branch to the memory copy instruction itself is triggered. In other examples, the operations indicated by micro-operations 60-72 could have been represented by separate program instructions in the representation of the program stored in memory, rather than being cracked by the instruction decoder 10 from a single memory copy instruction. Also, it will be appreciated that there could be other ways of adjusting the source/destination addresses and the size parameter in each iteration of the loop, so the particular example of incrementing src and dst by X and decrementing size by X is just one example.

Memory copy (memcpy) functions are one example where such a predicated loop of operations can be useful. However, there are also other library functions in programming languages such as C for which a similar technique can be useful. For example, the string.h C library functions for string processing can be implemented using a similar iterative technique where a certain operation is performed on a variable number of bytes and a loop is iterated a number of times until the required number of bytes have been processed. In the memory copy example, the predicated vector load micro-operation 62 is followed by a predicated vector store micro-operation 64, but other string processing functions could have a different operation after the predicated vector load micro-operation 62.

For example, the memcmp( ) function, which is for comparing a number of bytes of two strings to determine whether they are the same, may provide a predicated vector compare micro-operation instead of the vector store micro-operation 64. The predicated vector compare operation may perform an element-by-element comparison of the vector loaded by the load micro-operation 62 with a second vector representing a string to be compared (e.g. each element of the two vectors may represent one character of the respective strings), and a comparison result may be set depending on the comparison outcomes of each pair of active elements within the two vectors (and depending on the comparison outcome of any preceding iteration of the loop). A predicate operand (generated based on the variable number of bytes determined at micro-operation 60) can be used to ensure that the comparison outcomes for any inactive elements do not contribute to the comparison results.

Another example of a string processing function which could use a similar approach is the strlen( ) function which detects the length of string stored at a particular region of memory, by loading the string from memory and searching for the position of the first byte of data having a value of 0 after the start of the string. This can be implemented using a loop as shown in FIG. 2 where the vector load 62 loads a portion of the string from memory and a subsequent vector comparison instruction performed instead of the store micro-operation 64 compares each of the loaded bytes of data against 0. Again, a predicate operand can be used to predicate the load operation so that the number of bytes X processed in a given iteration may be selected so as to cause the source address for the next iteration to be an aligned address to improve performance, and this predicate operand may then also predicate the subsequent compare micro-operation to ensure that the overall comparison results does not incorrectly depend on data within an inactive element of the vector.

Another example of a string processing function which could use a similar approach is the memset( ) function which sets each byte within a given destination region of memory to a certain predetermined value, where the number of bytes updated in the destination region of memory is determined based on a parameter of the instruction, and again an iterative approach can be used where each iteration determines a certain number of bytes X to be processed (e.g. based on the maximum size supported for the memory transaction, the number of remaining bytes, and address alignment), and then issues a predicated store predicated based on the determined number of bytes X, before updating the store address and the number of remaining bytes parameter based on the variable number of bytes X processed in that iteration, and then conditionally branching for another iteration of the loop body if there is still at least one further byte remaining to be processed. For memset( ) there would be no need for the predicated loop body to include the predicated load micro-operation 62 shown in FIG. 2.

It will be appreciated that these are only some examples of processing functions which could use the technique discussed below. Although FIG. 2 shows an example where the micro-operations for a given iteration of the predicated loop body are generated by the instruction decoder 10 in response to a single combined instruction, it would also be possible in other implementations for the operations of the predicated loop body to be defined a separate program instructions in the representation of the program code stored in memory. Also, while FIG. 2 shows an example where the instruction that controls the performance of all or part of the predicated loop body also triggers the conditional branch depending on whether the loop termination is satisfied, it would also be possible for the conditional branch on each iteration of the predicated loop body to be performed in response to a micro-operation generated in response to a separate branch instruction included in the program code stored in memory separate from the instruction implementing the predicated loop body of the memcpy or other string processing function.

Memory copy functions and other string processing functions are some of the most common library functions to be used by software applications. Applications using these functions can therefore see a significant performance improvement if processing of these functions can be accelerated. Including a dedicated program instruction in the instruction set architecture, such as the memcpy instruction shown in FIG. 2, can help to reduce the overhead of fetching instructions from the cache or memory, although this is not essential and as mentioned above it would also be possible to promote these functions using a number of separate program instructions. Nevertheless, the performance achieved for such instructions may depend on the way in which branch prediction is handled for these instructions, because the branch predictor 40 may need to predict how many iterations of the operations associated with the predicated loop body are to be fetched and issued for execution. This depends on prediction of the outcome of a predicated-loop-terminating branch instruction, such as the memcpy instruction shown in FIG. 2 or a separate conditional branch instruction following the instruction(s) of the predicated loop body of such a predicated loop, and that outcome may be relatively hard to predict because the point at which the loop terminates may be affected both by memory address alignment and copy data size (the total number of bytes required to be processed, as specified by the remaining bytes parameter provided for the first iteration of the loop).

Typically, the processing circuitry 16 can adjust the number of bytes X selected for copying in a given loop iteration based on load/store address alignment, because modern CPUs generally prefer to load/store data with a certain aligned address (e.g., 16-byte aligned, or aligned to some other boundary associated with a block size corresponding to a certain power-of-2 number of bytes). To force this alignment, the memcpy function in the predicated loop body can copy a small number of bytes instead of processing entire word in the first iteration, so that the address for the next iteration becomes aligned.

For example, in the case of memcpy(dst, src, 30), the number of iterations for the entire memcpy loop can vary based on the address alignment (assuming 16-byte alignment in this example):

(a) Src=0x100
    Iter-1: Copy 16 bytes//after iter-1, src=0x110, remaining size=14
    Iter-2: Copy 14 bytes (b) Src=0x1fc
    Iter-1: Copy 4 bytes//after iter-1, src=0x200, remaining size=26
    Iter-2: Copy 16 bytes//after iter-2, src=0x210, remaining size=10
    Iter-3: Copy 10 bytes The application may see further divergence when input size is different (e.g. size=10 and size=100 will cause different control flow).

Therefore, the total number of iterations required can diverge significantly depending on the data-dependent inputs to the predicated loop function, which makes predicting the outcome hard for the branch prediction circuitry. As shown in FIG. 1 the branch predictor 40 may have a prediction structure (e.g. BTB 42, branch direction predictor 44, or a separate prediction structure), which can be used to predict whether a given iteration of the loop terminating branch within the predicated loop will terminate the loop. A number of entries may be maintained, looked up based on lookup information such as an instruction address associated with an instruction corresponding to the loop, such as the memcpy instruction shown in FIG. 2, and/or history information indicative of a history of program flow leading up to that instruction (e.g. global branch history updated based on a sequence of taken/not-taken outcomes for a number of recent branches). Each entry could track, for example, the predicted number of iterations of the loop, or in other examples could correspond to a specific iteration of the loop and indicate whether the loop terminating branch on that iteration is predicted to be taken or not taken. While such predictions can help to partially reduce the number of branch mispredictions for such predicated loops, there may still be a significant number of mispredictions because the number of required iterations may vary for some loops from one instance to another based on the size and address alignment of the operands, and so the behaviour learned from a previous instance of the loop may no longer be accurate. Some techniques for reducing the latency penalty associated with such branches are discussed below.

Suppression of Flushing Unnecessary Iterations of Predicated Loop Body

Figure 4:
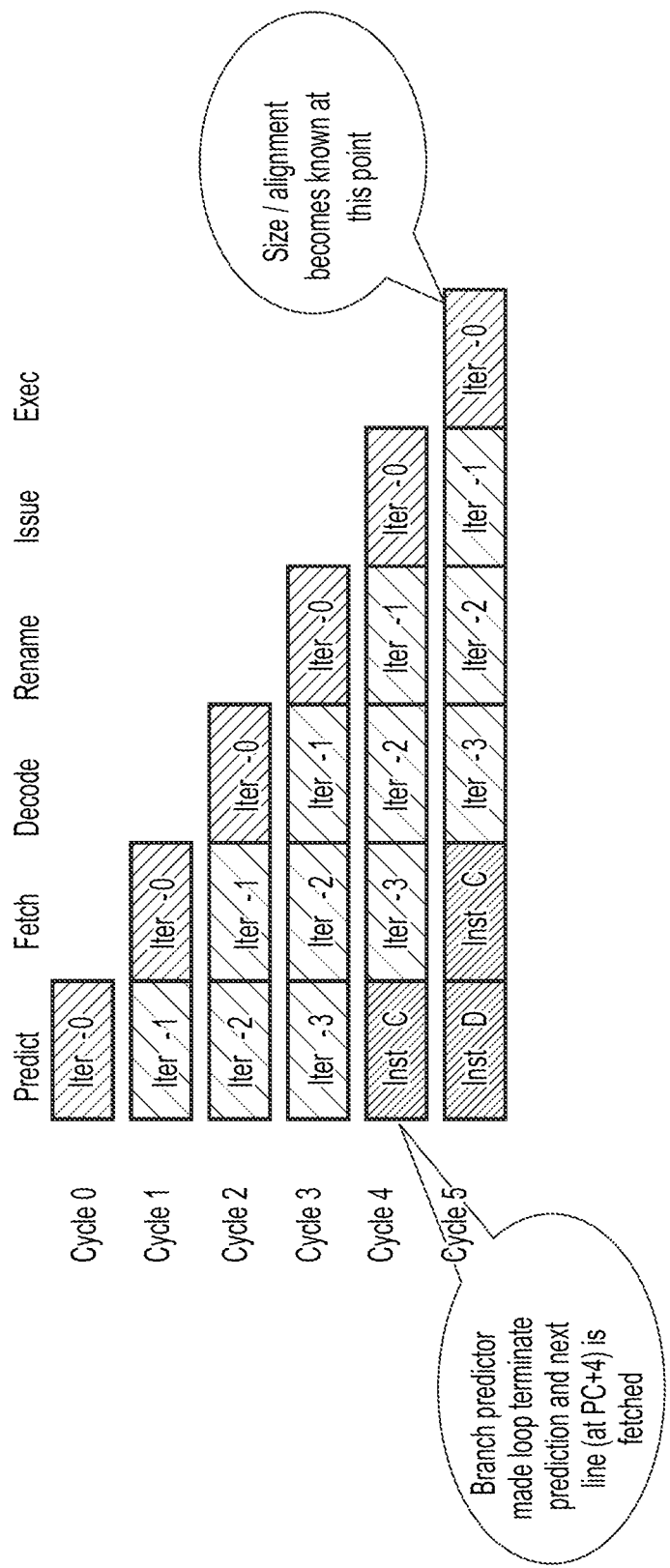
FIG. 4 is a pipeline diagram illustrating processing of a number of iterations of a predicated loop body.

FIG. 4 shows a general pipeline diagram illustrating processing of a number of iterations of the predicated loop body using a processing pipeline having a number of pipeline stages. In this example the pipeline stages include: a prediction stage corresponding to the operation of the branch predictor 40, the fetch stage 6, the decode stage 10, a register renaming stage (not illustrated in the example of FIG. 1) at which architectural register specifiers specified by the decoded instructions are mapped (renamed) to physical register specifiers identifying registers 14 provided in hardware (other examples may omit the register renaming stage); the issue stage 12; and the execute stage 16. Of course, this is just one example of a possible set of pipeline stages.

Instructions or micro-operations associated with each iteration of the loop progress from stage to stage of the pipeline so that while the instructions or micro-operations associated with an earlier iteration are at a later stage of the pipeline, the instructions or micro-operations associated with a later iteration can be processed at an earlier stage of the pipeline. In this example, for conciseness it has been assumed that the operations performed at a given stage for a given iteration of the predicated loop can be completed in one processing cycle (even if the processing operations corresponding to that iteration are mapped to multiple micro-operations by the decode stage 10). It will be appreciated that other implementations could take more than one cycle for some stages and so the particular timings shown in FIG. 4 are just one example.

In cycle 0, the branch predictor 40 receives, as an address for which a branch prediction should be made, an address of an instruction corresponding to iteration 0 of the loop, and predicts that the loop termination condition will not be satisfied so that a further iteration, iteration 1, will be required. Similarly, the branch predictor 40 continues to predict that the loop termination condition will not be satisfied for subsequent iterations, until when predicting the outcome of iteration 3 the determination condition is predicted to be satisfied, so that the prediction is that after iteration 3 is complete, the next instruction should be instruction C which follows the loop (as instruction C is the instruction following the memcpy instruction in the example of FIG. 2). Based on these predictions the branch predictor 40 controls the fetch stage 6 to fetch the required number of iterations of the instructions corresponding to the program loop body (e.g. a single memcpy instruction per iteration in the example of FIG. 2), and the subsequent stages then carry out their respective functions of decoding, renaming (if supported) and issuing, before the decoded micro-operations reached the execute stage for iteration 0 in cycle 5 in this particular example. At the point when the micro-operations corresponding to iteration 0 reach the execute stage 16, the operands for the micro-operations in iteration 0 are available, for example, the size parameter which determines the number of remaining bytes to be processed and the address for which the load/store is to be performed become known. These parameters can be used to determine whether the conditional branch for iteration 0 should have been triggered, and so at this point the branch misprediction detection circuitry 46 can determine whether the branch prediction for iteration 0 was correct.

Figure 5:
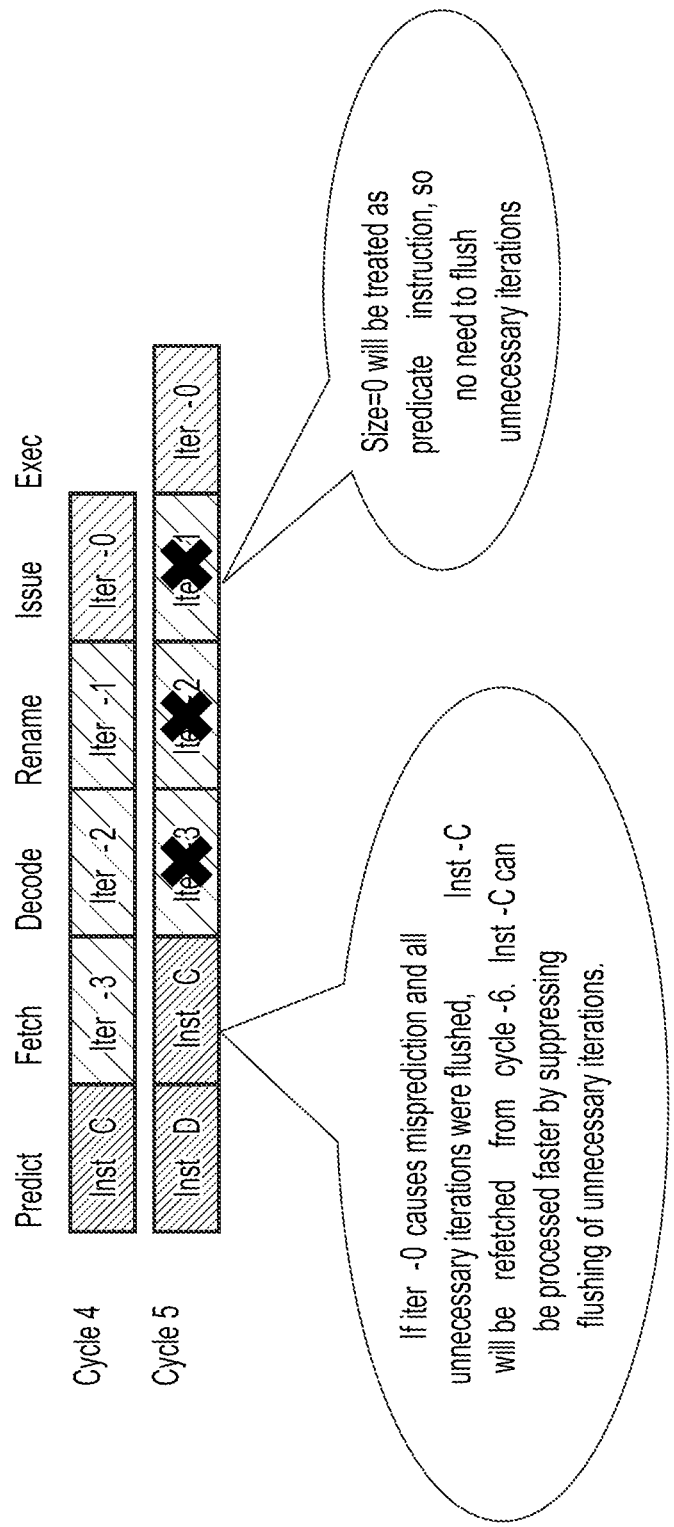
FIG. 5 is a pipeline diagram illustrating suppression of flushing of unnecessary iterations of the predicated loop body.

Normally, if it is now determined that a branch prediction was incorrect, the response taken by the branch misprediction detection circuitry 46 would be to flush the pipeline of any operations which are younger than the micro-operation for which the misprediction occurs, and so if iteration 0 is mispredicted as shown in the example of FIG. 5, one would normally expect to flush the micro-operations associated with iterations 1, 2, 3 which were unnecessary iterations which should not have been fetched. Normally, after triggering such a flush, fetching of instructions may then resume from the correct instruction which should have executed after the mispredicted branch.

However, in the example of FIG. 5, if a flush was triggered in response to the misprediction arising for iteration 0, this would flush the pipeline of all the remaining younger micro-operations after iteration 0, and re-fetching of the instructions to be processed after the branch would then commence in cycle 6 after the cycle 5 in which the branch misprediction was identified. In the example shown in FIG. 5, the correct number of loop iterations to be executed for the predicated loop should have been 1, so that the following instruction C should have been executed directly after the operations associated with iteration 0 of the predicated loop.

As shown in FIGS. 4 and 5, at the point when the branch misprediction is identified in cycle 5 when the micro-operations for iteration 0 reach the execute stage, the following instruction C may already have been fetched and be resident within the pipeline. Therefore, the following instruction C to be processed based on the correct branch prediction outcome can be processed faster by not flushing micro-operations after the mispredicted branch for iteration 0, but instead allowing the unnecessary loop iterations 1, 2, 3 to remain in the pipeline without being flushed. This is possible because the nature of the predicated loop body is such that if it is executed unnecessarily following a mispredicted-non-termination branch misprediction when the loop termination condition was predicted to be not satisfied when it should have been satisfied, then in any case the predication used for the operations within the predicated loop body means that the architectural effects of the unnecessarily executed operations will be suppressed. Using the example shown in FIG. 2, for instance, if an unnecessary loop iteration is carried out then the size parameter supplied for that iteration will be 0 (since if the correct outcome of the loop termination condition evaluation in the preceding iteration was that the loop should have terminated, this implies that the size was equal to 0 at the end of that iteration). If the size parameter is 0, then the load/store operations will be predicated to suppress the effects of the load/store (e.g. the destination register of the load will not be updated with data loaded from memory, and issuing of store requests to memory may be suppressed for the store operation when the predicate indicates that all the elements of the vector are inactive because the required number of bytes to be stored is 0). Similarly, incrementing the address parameters by X and decrementing the size by X will have no architectural effect if X=0. Therefore, it is possible to allow the micro-operations corresponding to unnecessary loop iterations fetched following a branch misprediction to remain without being flushed. By suppressing the flushing of the unnecessary iterations, the next instruction can be processed faster.

Early Pipeline Flush when Loop Predicted to Terminate Too Early

FIG. 5 shows an example where the branch predictor over-predicted the required number of loop iterations, leading to some unnecessary loop iterations being fetched for processing.

Figure 6:
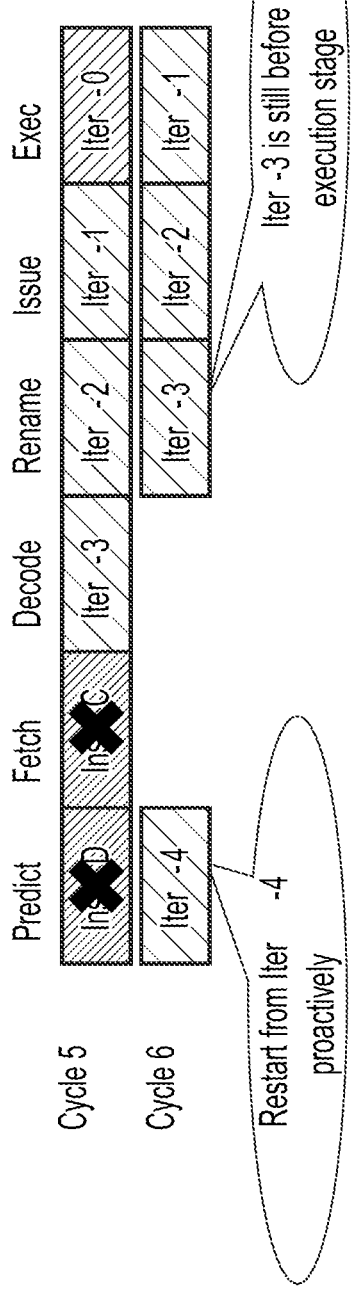
FIG. 6 is a pipeline diagram illustrating early flushing of iterations of the predicated loop body.

However, as shown in FIG. 6 it is also possible for a branch misprediction to cause insufficient loop iterations to be fetched for processing. For example, in FIG. 6 the branch predictions were correct for iterations 0, 1 and 2, but when making the prediction of whether the loop termination was satisfied for iteration 3, the branch predictor 40 predicted that the loop termination condition would be satisfied when it actually should not have been satisfied, so the fetch stage 6 fetched the next instructions C, D when a further loop iteration Iter-4 should have been fetched. Hence, the following instructions C, D fetched into the pipeline based on the loop termination prediction predicted for iteration 3 should be flushed and fetching should resume from iteration 4 so that at least one further iteration of the predicated loop body will be processed.

Normally, one would expect that branch mispredictions would be resolved when the mispredicted instruction or micro-operation reaches the execute stage 16 at which the operands of that instruction or micro-operation become available. Therefore, in a typical approach in the scenario shown in FIG. 6, one would expect that the branch misprediction for iteration 3 would be resolved when iteration 3 reaches the execute stage 16. However, for predicated loops of the type shown in FIG. 2, it is recognised that the total number of required loop iterations can be deduced from the operands provided for the very first iteration of the loop (in this case, iteration 0). For example, the total number of iterations can be deduced from the size parameter and load/store address provided for the first iteration of the loop and an indication of the maximum number of bytes that can be processed in a single iteration. Some circuit logic may be provided to analyse the address alignment and the size parameter and use this to calculate how many loop iterations will be required in total. For example, for the examples (a) and (b) provided above, this circuit logic may determine that the required number of iterations is 2 and 3 respectively. Hence, at the time that the first iteration 0 reaches the execute stage, the branch misprediction detection circuitry 46 can already detect whether any of the subsequent iterations have been mispredicted by the branch predictor 40, even though the micro-operations for those subsequent iterations have not yet reached the execute stage 16. If the mispredicted iteration is iteration 3, say, there is no need to wait for the corresponding micro-operations associated with iteration 3 to reach the execute stage before triggering the flush of the incorrectly fetched instructions C, D, and instead a flush can be initiated early, where rather than flushing all operations younger than the micro-operation currently at the execute stage 16, the flush can flush from the pipeline the operations which are younger than the micro-operations corresponding to the mispredicted iteration 3, which in the example of FIG. 6 is currently at the rename stage.

This early flushing of operations is possible because the nature of the predicated loop is such that the total number of micro-operations generated by the instruction decoding stage 10 per loop iteration remains fixed for every loop iteration, so that based on the loop iteration currently at the execute stage and the number of further iterations expected before the iteration which was mispredicted, the branch misprediction detection circuitry 46 can identify an instruction identifier or other indication associated with the point of program flow beyond which instructions or micro-operations should be flushed from the pipeline, even if the branch misprediction detection circuitry 46 does not currently have those instructions or micro-operations available at the execute stage. For example, if the fixed number of micro-operations performed per loop iteration is M and the micro-operation identifier associated with the iteration at the execute stage when the branch misprediction for a subsequent iteration is identified is uid, and it is assumed that the instruction decoder will sequentially allocate micro-operation identifiers in an order corresponding to the program order as it generates micro-operations, then the micro-operation identifier representing the point beyond which micro-operations should be flushed from the pipeline may be uid+X*M, where X is the number of additional iterations of the loop that were fetched after iteration 0 before the iteration which encountered the misprediction is reached (e.g. for the example in FIG. 6, X=3). Hence, with this approach, when a mispredicted-termination branch misprediction occurs, the corresponding flush of the pipeline can be initiated early even though the iteration that encountered that misprediction has not yet reached the execute stage. Again, this can improve performance because the iteration 4 which should have executed after iteration 3 can be re-fetched earlier than would be the case if the flush was not is initiated until iteration 3 which the execute stage.

Figure 7:
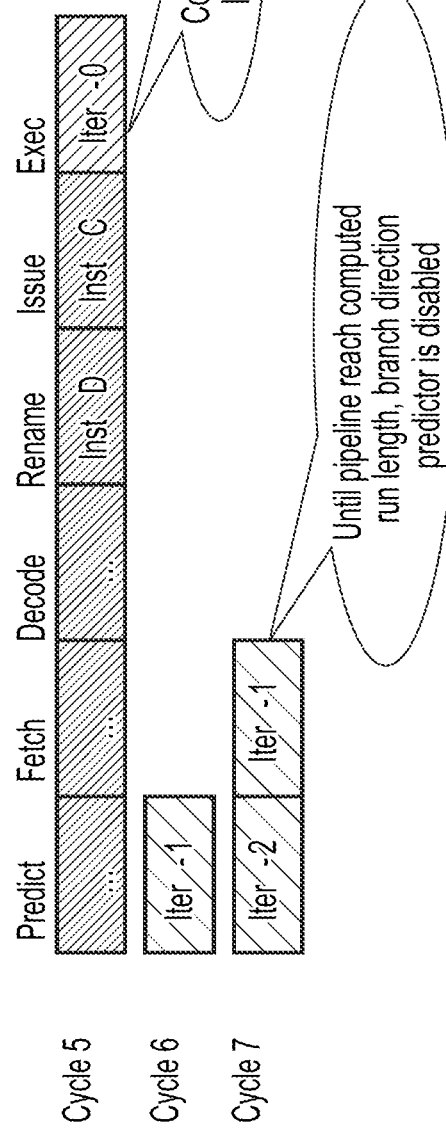
FIG. 7 illustrates disabling branch prediction circuitry from making branch predictions based on branch direction prediction state obtained prior to encountering a first iteration of the predicated loop body, following a mispredicted iteration of the predicated loop body.

Use of Run Length Computed at First Loop Iteration to Predict Outcome of Subsequent Iterations Another problem with performing branch prediction for predicated loops of the type discussed above may be back-to-back branch mispredictions where the branch outcome is mispredicted for several successive iterations within the same predicated loop. As shown in FIG. 1, the branch predictor 40 may store prediction state information for predicting the loop termination condition outcome for a given iteration of the predicated loop body, based on information learnt from previous attempts to perform the same loop. However, a problem is that when training the predicated loop prediction structure 48, the number of iterations executed within the loop may vary from one training run to another, so there can be frequent mispredictions. FIG. 7 shows a technique for mitigating against this problem. In response to the first iteration of the predicated loop body, the execute stage 16 can determine, based on the operands of the first iteration, the actual run length (number of iterations) expected for the loop. This is possible because the number of bytes of data processed per loop iteration is deterministic once the operands (such as the load/store address and the required number of bytes to be processed) are known. The actual run length can be stored by the branch predictor (e.g. in a side structure, such as a register or cache structure separate from existing branch prediction structures 42, 44, or in an existing structure 42, 44 of the branch predictor 40 which can have entries reused for other types of branch prediction information). Unlike the prediction state information used for predicting the number of iterations initially, which is learnt from previous attempts at executing the loop, the expected run length may indicate information detected from the current attempt at executing the loop, when the processing circuitry has resolved the actual number of loop iterations based on operands of the first loop iteration.

For the remaining iterations of the loop, the use of the trained prediction state stored in the prediction structures 42, 44 (based on past observations of attempts at executing the loop) for making branch predictions can be disabled, since the outcome of the branch in subsequent iterations can be predicted more accurately from the actual run length computed based on the operands of the first iteration of the current attempt at executing the loop. By disabling the branch predictor 40 from making branch predictions based on state learnt before the first iteration of the current loop was encountered, this improves performance by using the more reliable actual information derived from the first loop iteration. Once the loop has terminated, the branch predictor 40 re-enables dynamic prediction based on prediction state stored prior to encountering the first iteration of the predicated loop.

Branch Predictor Training for Long Loops

Figure 8:
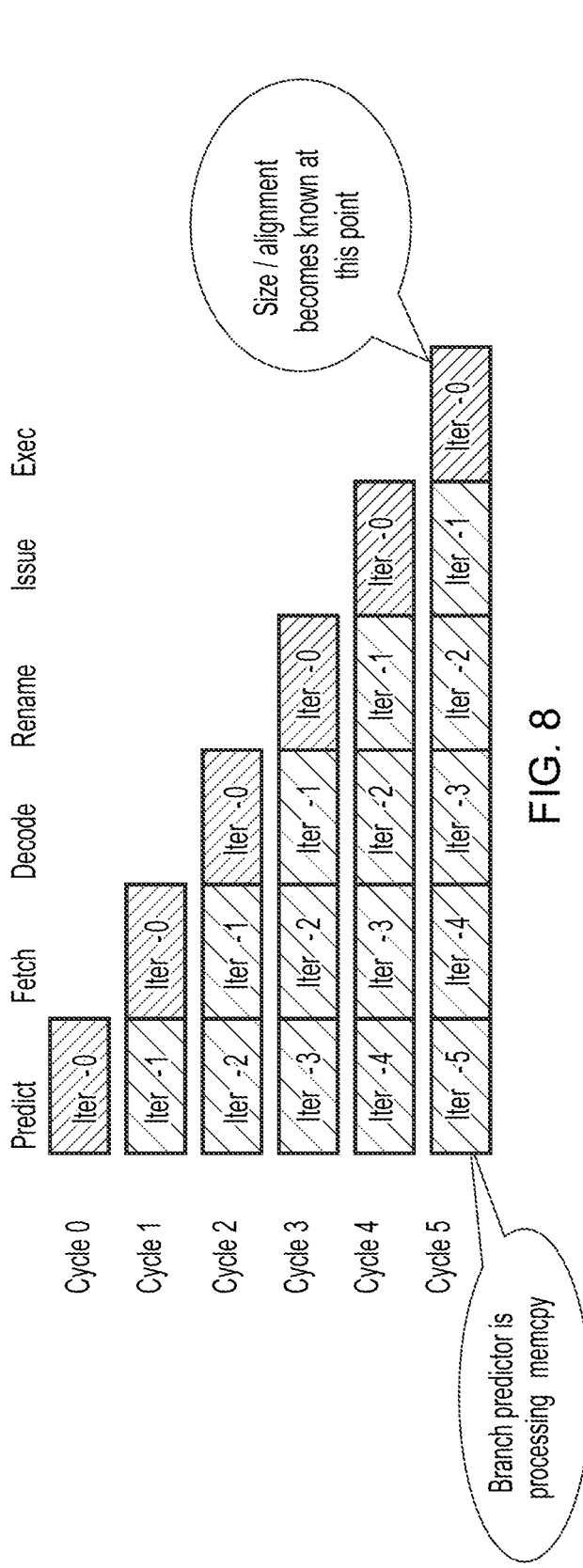
FIG. 8 illustrates a long loop example where, at the time of determining the outcome of a first iteration of the predicated loop body, the branch prediction circuitry has not yet predicted termination of the loop.

FIG. 8 illustrates an example when the number of iterations required for the predicated is relatively large so that when the first iteration reaches the execute stage 16, the branch predictor 40 has not yet made a loop termination prediction for a subsequent iteration of the loop. Hence, at the point when the number of bytes (size) to be processed and the alignment of the addresses becomes known, the branch predictor 40 is still processing instances of the predicated-loop-terminating branch instruction.

Figure 9:
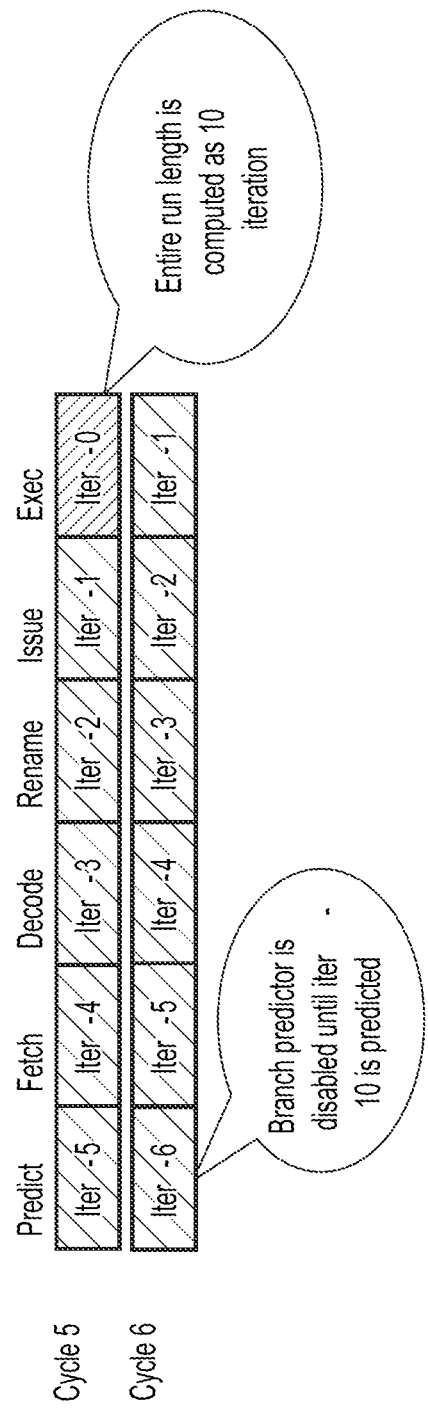
FIG. 9 illustrates an example of controlling fetching of subsequent iterations of the predicated loop body using a run length computed in response to execution of an initial iteration of the predicated loop body.

As shown in FIG. 9, the computation of the actual run length for the loop at the first loop iteration can also be useful in this scenario with a relatively long loop. Again, the actual run length is computed when the first iteration of the loop reaches the execute stage 16, and the actual run length is provided to the branch predictor 40 as discussed above FIG. 7. As in FIG. 7, branch direction predictions made by the branch predictor 40 using prediction state 44 trained based on previous instances of encountering instructions prior to the first iteration of the current instance of the loop are disabled at this point, and for the remaining iterations of the current loop the actual run length is used to determine whether each iteration should terminate the loop or continue for another iteration. Hence, the subsequent iterations will be predicted as not satisfying the termination condition, until the iteration count reaches the actual run length for a given iteration, at which point the given iteration is predicted as satisfying the termination condition. Predictions based on previously stored prediction state can be re-enabled once the loop has been predicted to terminate. Again, this approach improves performance by reducing the likelihood of branch misprediction, because the branch outcome for each iteration can be predicted more accurately based on the actual run length determined at the first loop iteration based on the actual operands for the current instance of executing the loop, than is possible using the state information stored by branch predictor 40 which is trained based on previous attempts at execute the same loop which may have had different operands and therefore a different number of iterations.

Prediction Training

The memory copy instruction described above is an example where an iterative fetching process is performed, where the number of iterations of the fetching process will not be resolved until the execute stage but it is useful to predict how many iterations are required before reaching that stage, to reduce delays once the actual number of iterations is resolved.

The processing circuitry 16 can tolerate performing one or more unnecessary iterations of the fetching process. For example, as shown in FIG. 5 above, the predication applied to the micro-operations within the predicated loop of the memory copy instruction means that if the predicted number of iterations is higher than the actual resolved number of iterations (an over-prediction), there is no need to flush the unnecessary iterations because they can be executed without any adverse architectural effects due to their predication. A flush may still be required if the prediction predicted too few iterations as shown in FIG. 6.

Hence, as flushes can be avoided on an over-prediction of the number of iterations, predicting the number of iterations is different to classic prediction algorithms such as branch prediction or value prediction algorithms, which typically aim to predict the required behaviour exactly, and treat as a misprediction any prediction other than the actual behaviour once resolved. With the prediction of the number of iterations of an iterative fetching process where the processing circuitry 16 can tolerate performing one or more unnecessary iterations, the prediction does not need to be accurate. Instead, it is sufficient to use a prediction which is good enough to avoid flushes due to under-prediction, so this allows a wider range of tolerance. As shown in FIGS. 7 to 9, the actual number of iterations may be resolvable once the first iteration reaches the execute stage 16, and so there is a limit to the maximum number of iterations that the branch predictor 40 needs to predict, as beyond that number of iterations the actual number of iterations computed for the first iteration (Iter-0) can be fed back to the branch predictor 40 as discussed above to avoid using dynamic predictions for remaining iterations. This limit depends on the depth of the pipeline, so can vary from one implementation to another.

Also, to avoid unnecessary power consumption there may be a certain maximum number of unnecessary loop iterations that the system designer wishes the processing circuitry 16 to tolerate. For example, the processing circuitry 16 and branch misprediction detection circuitry 46 may be configured to respond to an over-prediction in the number of iterations required, by flushing at least one unnecessary iteration from the pipeline if the number of unnecessary iterations fetched for processing by the processing circuitry is greater than N, and suppress flushing of unnecessary iterations already fetched for processing if the number of unnecessary iterations is less than or equal to N. Again, this limit N to the number of unnecessary iterations that can be tolerated without flushing can be based on the depth of the pipeline as even if there is an over-prediction where the actual number of iterations is very small and the pipeline is fully filled with subsequent unnecessary iterations at the point when the actual number of iterations is resolved, the branch predictor 40 can then adjust the fetching based on the resolved actual number of iterations fed back from the execute stage 16, to avoid fetching further unnecessary iterations even if the original prediction predicted that more iterations would be required, and can instead switch to fetching the subsequent instructions after the loop.

Both of these factors mean that there may be a certain maximum number N of unnecessary iterations expected to be performed, and so the good enough range for the iteration number predictions can be the range from i_cnt to i_cnt+N, where i_cnt is the actual number of predictions resolved for a given instance of performing the iterative fetching process (e.g. the predicated loop as discussed above for the memory copy example). Predictions outside of this range can be considered a misprediction. If the prediction is lower than this range, then this is an under-prediction and this is the performance-critical case where a flush may be needed and so it is desirable to avoid under-predictions. Over-predictions are less critical to performance because they would not require a flush, but it may still be preferable to avoid fetching too many unnecessary loop iterations which could reduce power efficiency.

Hence, in the examples below, the prediction training scheme (applied by the branch misprediction detection circuitry 46 and/or branch predictor 40) updates prediction state based on whether predictions made are a good prediction or a misprediction, as determined based on whether the prediction fell within the range i_cnt to i_cnt+N as described above. If the prediction is a good prediction then updates are made to reinforce that prediction to make it more likely that a similar prediction will occur again (e.g. a confidence parameter could be updated to increase confidence in the prediction). If the prediction is a misprediction then updates are made to make it less likely that the prediction occurs again, for example by decreasing confidence indicated by a conference parameter or by updating the parameter used to determine the predicted number of iterations to adjust it so that future predictions provide a predicted number of iterations closer to the actual number of iterations seen from the resolved iteration count.

By permitting the wider range of tolerance in what is considered a good prediction, this can simplify the training scheme and also skew the average prediction made so that it is slightly higher than the average of the actual numbers of iterations, which can help to reduce the probability of under-predictions occurring, helping to improve performance by requiring the flush less often.

Figure 10:
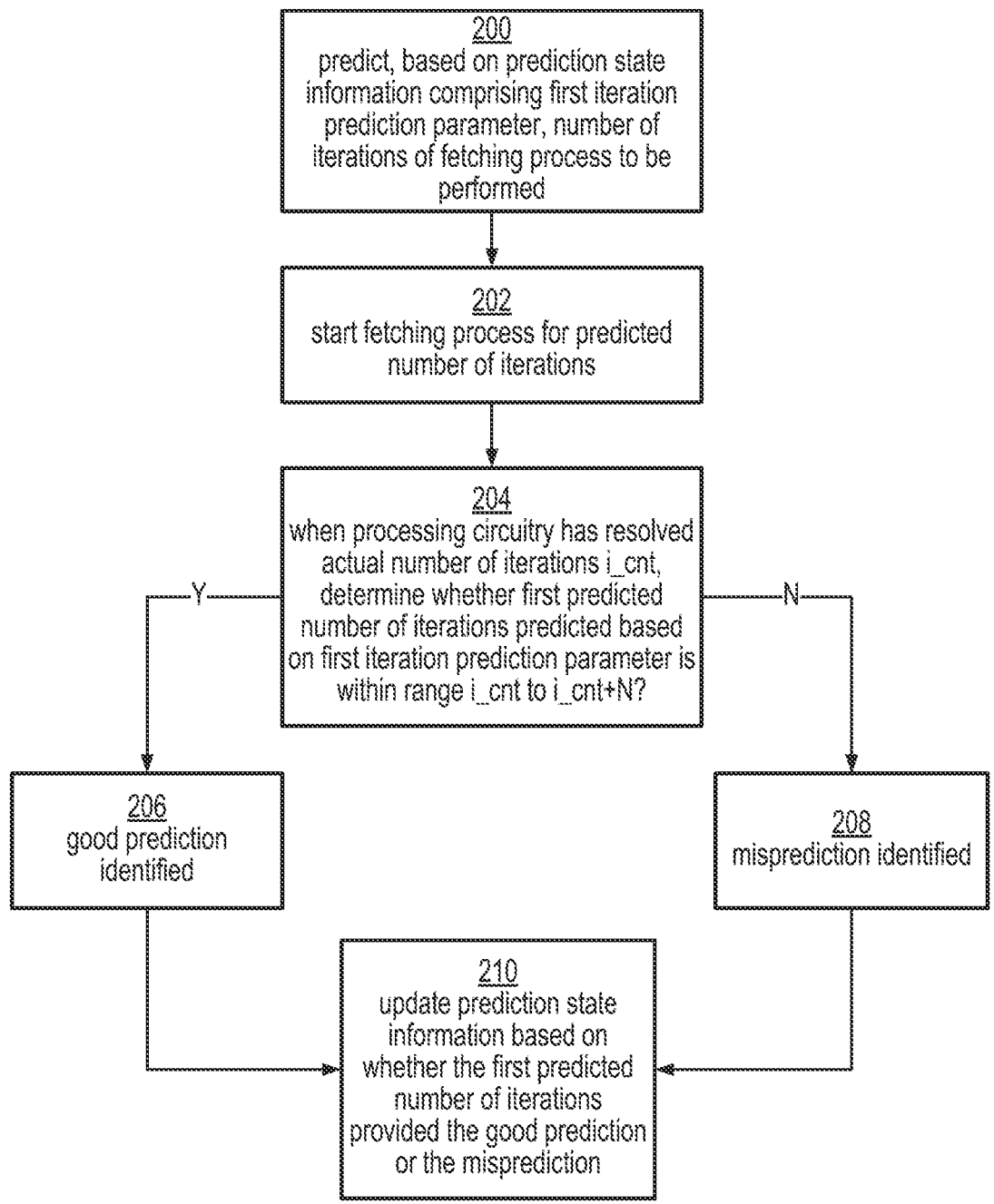
FIG. 10 is a flow diagram illustrating a method of updating prediction state information based on whether a first predicted number of iterations provides a good prediction or a misprediction.

FIG. 10 is a flow diagram illustrating a method of controlling prediction state information updates. At step 200, the prediction circuitry 40 predicts, based on prediction state information comprising a first iteration prediction parameter (e.g. the average count parameter avg_cnt mentioned below), a number of iterations of a fetching process to be performed to fetch data or instructions predicted to be used by processing operations performed by the processing circuitry 16. At step 202, fetching circuitry (e.g. instruction fetch stage 6 or the prefetcher 50 or load/store unit 26) starts performing the fetching process based on the predicted number of iterations. At step 204, when the processing circuitry 16 has resolved the actual number of iterations, i_cnt, the prediction circuitry 40 determines whether a first predicted number of iterations predicted based on the first iteration prediction parameter is within the range i_cnt to i_cnt+N (N is an integer equal to or greater than 1). For conciseness, this range i_cnt to i_cnt+N is referred to as the "good enough" range below. The first number of iterations predicted based on the first iteration prediction parameter could be the same as the number of iterations predicted at step 200 and used to control the fetching process at step 202. However, in some examples, on some occasions the fetching process 202 could be controlled based on a prediction derived from another prediction parameter other than the first iteration prediction parameter, but in this case nevertheless at step 204 the determination is whether the first predicted number of iterations, that would have been predicted if the first iteration prediction parameter had been used, is within the good enough range.

If the first predicted number of iterations is within the good enough range (if the predicted number is equal to one of the range boundaries i_cnt, i_cnt+N this may still be considered to be within the good enough range), then at step 206 a good prediction is identified as having occurred based on the first iteration prediction parameter. If the first predicted number of iterations is outside the good enough range, the prediction based on the first iteration prediction parameters treated as a misprediction.

At step 210, the prediction circuitry 40 updates the prediction state information stored in at least one prediction structure, based on whether the first predicted number of iterations providing the good prediction or the misprediction.

The examples below show a particular implementation of this prediction state update scheme, in an embodiment where the fetching process is the fetching of instructions for a predicated loop such as the memory copy loop described above in FIG. 2. However, it will be appreciated that a similar prediction state update scheme, with a wider range of tolerance in determining whether prediction is good or incorrect, could also be used for other instances of predicting the number of iterations of an iterative fetching process where the processing circuitry can tolerate performing unnecessary iterations. Another example of such a fetching process is where the prefetch circuitry 50 generates a number of iterations of prefetch requests to prefetch a variable number of cache lines into a cache 30, 32, 8. It is not a problem if the prefetch circuitry 50 generates too many prefetch requests to prefetch a larger number of cache lines than are really required, as this may merely waste some memory system bandwidth (and possibly evict some other data or instructions from the cache) but the architectural results of processing will still be correct. There may be a greater penalty for performance if the number of prefetched lines is too few, as in that case the load/store instructions executed by the processing circuitry 16 for the stream of accesses being predicted may encounter some additional misses in the cache. Hence, training to obtain a prediction in the range i_cnt to i_cnt+N (where i_cnt is the actual number of cache lines required to be prefetched in a given prefetch pattern, such as a stride sequence) can help to reduce the likelihood of the stream of addresses generated by the demand load/store instructions encountering misses. The prefetch prediction scheme could predict the required number of cache lines (iterations of the prefetch process) based on average/maximum counters in a similar scheme to the one shown for the predicated loop branch prediction below.

Figure 11:
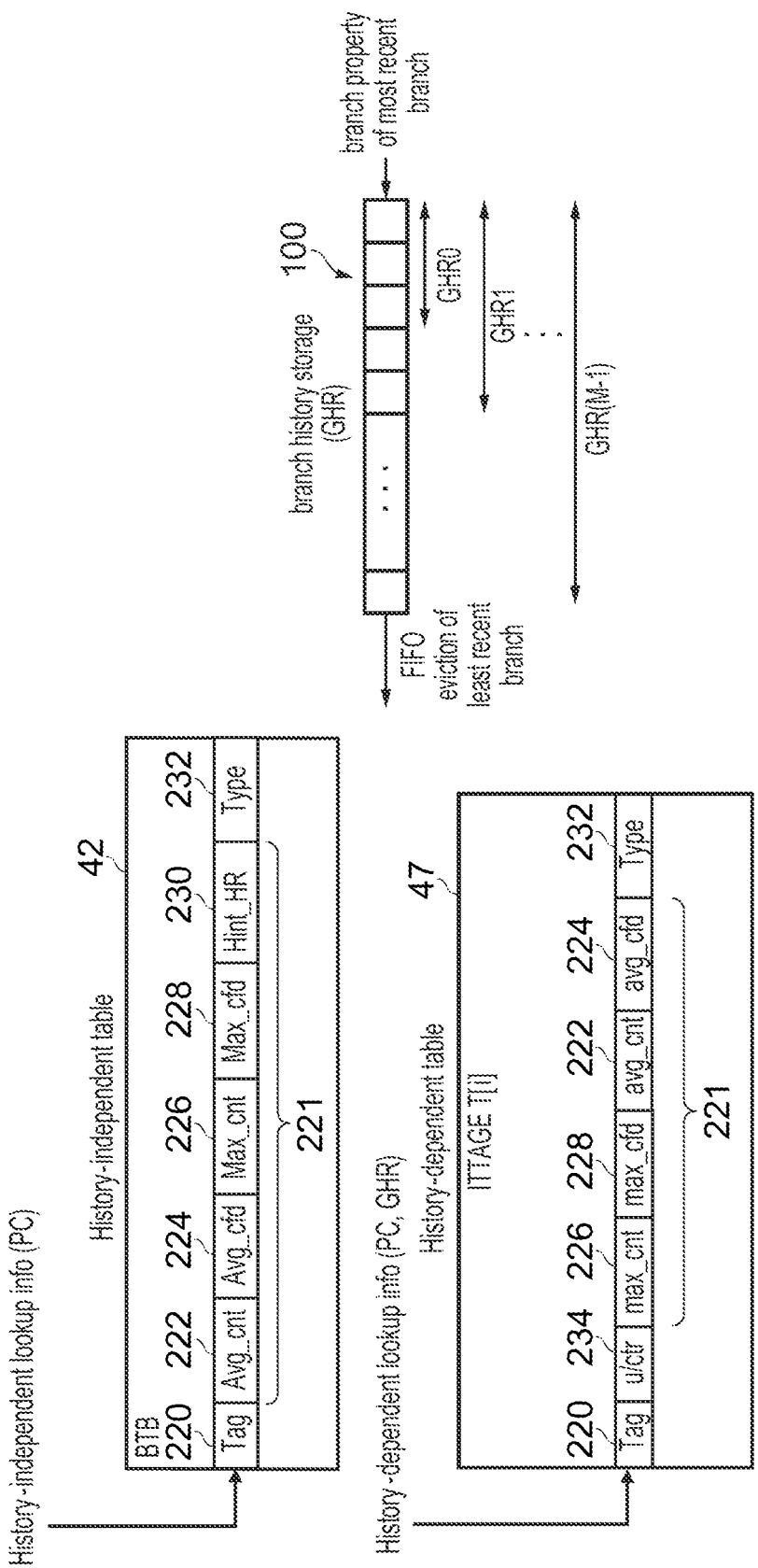
FIG. 11 illustrates a history-independent table and a history-dependent table providing prediction state information for predicting the number of iterations.

FIG. 11 illustrates an example of prediction state information used to predict the number of loop iterations for fetching of instructions for the predicated loop. The branch predictor 40 has a history-independent table (e.g. the BTB 42 mentioned earlier) and a history-dependent table 47 (which may be a further prediction structure, other than the BTB 42 and branch direction predictor 44).

In this example, both the history-independent table 42 and the history-dependent table 47 are structures which are also used for other types of branch prediction, for branches other than the predicated-loop-terminating branch instruction such as the memcpy instruction described earlier. For example, the BTB 42 is used to predict target addresses (and optionally other properties) of branch instructions, but entries of the BTB can also be reused to provide prediction state information for predicting the number of loop iterations for a predicated-loop-terminating branch instruction. The history-dependent table 47 may for example be a polymorphic branch target address predictor (e.g. ITTAGE) which is used to predict branch target addresses for branches which are harder to predict and which may benefit from a history-dependent look up based on program flow history information. Again, the entries of the polymorphic branch target address predictor 47 may be reused to provide predictions of the number of loop iterations required for a predicated-loop-terminating branch instruction, which can be useful for harder-to-predict loops whose behaviour varies depending on preceding program flow.

The branch predictor 40 has history tracking circuitry 100 for maintaining history information indicative of a history of program flow. In this example, the history tracking circuitry 100 is branch history storage, e.g. a global history register (GHR), for which the history information indicates a sequence of taken/not-taken outcomes for a number of recent branch instructions. Each time a branch is predicted (or in some examples, each time a branch meeting certain conditions is predicted), the predicted taken/not-taken outcome for that branch by the execute stage 16 is pushed into the branch history storage and the least recent entry of the branch history storage is evicted. Hence, the branch history storage 100 acts as a FIFO (first in, first out) buffer, retaining a certain number of entries for the most recent branches that meet the requirements for allocating a new entry to the branch history storage 100. Unlike other tables such as the history-independent table 42 and the history-dependent table 47, the branch history storage 100 tracks the order in which the observed branch outcomes have been encountered—a sequence of outcomes TNT is different from a sequence of outcomes NTT. Also, it is not necessary to attribute any of the entries of the branch history storage 100 to be able to look up the outcome of any particular branch from the branch history storage 100, as the branch history storage 100 is tracking a property of the program flow as a whole. The sequence of branch outcomes recorded by the branch history storage 100 can be an indication of the history of program flow that resulted in program flow reaching the current program counter (PC) address for which a branch prediction is being made. Hence, when branches are conditional on operands resulting from earlier program flow, the history information can be useful in distinguishing which path of program flow led to the branch and hence provide more accurate predictions for branches.

While FIG. 11 shows an example where the branch history information recorded indicates taken/not-taken outcomes, other examples may track other information about recent branches which can be used as a measure of program flow, such as information derived from program counter addresses or branch target addresses of branches, which could be hashed to reduce the size and either tracked independent of the taken/not-taken outcome or recorded/hashed together with the taken/not-taken outcome.

Hence, in general the history tracking circuitry 100 provides history information which can be used as a measure of the preceding program flow up to a given program counter address being predicted using the prediction structures 42, 47.

The branch history storage 100 shown in FIG. 11 is one example of how history information indicative of program flow history can be maintained. Other approaches can also be used. For example, a call path hash value can be maintained based on a hash function applied to a sequence of function call addresses, which can provide an indication of the program flow history which has led up to the current point of the program flow. It is not essential to track such function call addresses sequentially in a FIFO buffer as in the branch history storage 100 example—instead the call addresses could sequentially be hashed together to produce a single data value which provides an indication of the program flow history. Hence, it will be appreciated that the history information used to indicate a history of program flow could be maintained in a number of different ways.

For the history-independent table (BTB) 42, a history-independent look up of the entries of the table 42 is performed based on history-independent lookup information derived from the program counter address of a current point of program flow for which a prediction is made. The history-independent lookup information does not depend on the program flow history information maintained by history storage 100.

Each entry of the history-independent table 42 includes at least:
- a tag field 220 compared with the history-independent lookup information to determine whether the entry corresponds to the history-independent lookup information;
- a target address field 221 for indicating the predicted target address of a branch instruction, when the entry is used for regular branch predictions other than predictions for the predicated-loop-terminating branch instruction; and
- a type field 232 for indicating whether the entry provides a prediction for the number of loop iterations to be fetched for a predicated-loop-terminating branch instruction, or a prediction of the target address for a branch instruction other than the predicated-loop-terminating branch instruction.

It will be appreciated that each BTB entry could also include other information not shown, such as a valid indication for indicating whether the entry is valid or invalid, or further branch property fields for indicating other branch properties (e.g. branch type, branch target address prediction confidence) used when making a prediction for a branch instruction other than the predicated-loop-terminating branch instruction.

In this example, the target address field 221 used for regular branch predictions is reused to provide prediction state information for predicting the number of loop iterations to be fetched for the predicated-loop-terminating branch instruction, when the type field 232 indicates that the entry corresponds to the predicated-loop-terminating branch instruction. This is because, for the example shown in FIG. 2 where the predicated-loop-terminating branch instruction branches to itself, there is no need to record a predicted target address since the instruction is implicitly branching to itself if the loop termination condition is not yet satisfied. Therefore, to avoid additional storage being needed per entry, the target address field 221 can be interpreted as other information including:
- an average counter (first iteration prediction parameter) 222, avg_cnt, indicating an average (first) number of iterations predicted for the corresponding predicated-loop-terminating branch instruction. The average can be adjusted according to a medium term average of the number of iterations resolved for a number of instances of seeing predicated-loop-terminating branch instructions corresponding to the looked up PC.
- an average confidence indicator (first confidence) 224, avg_cfd, indicating a level of confidence associated with the prediction based on the average counter 222.
- a maximum counter (maximum iteration prediction parameter) 226, max_cnt, indicating a prediction based on a maximum number of iterations seen across a number of instances of seeing predicated-loop-terminating branch instructions corresponding to the looked up PC.
- a maximum confidence indicator (second confidence) 228, max_cfd, indicating a level of confidence associated with the predication based on the maximum counter 226.
- hint information (Hint_HR) 230 used to determine whether to perform a history-dependent look up of the history-dependent table 47.

The history-dependent table 47 is looked up based on history-dependent lookup information derived from both the PC address and history information (GHR) obtained from the history storage 100. For example, the history-dependent lookup information can be a hash of the PC with the history information GHR. While FIG. 11 shows a single instance of the history-dependent table 47, some approaches may provide two or more different history-dependent tables that are looked up based on history-dependent lookup information derived from different sized portions GHR0, GHR1, ..., GHR(M−1) of history (e.g. corresponding to different numbers of branches). In such an example, if more than one of the tables looked up based on the different lengths of history detects a hit, the prediction is based on the one of those tables which was looked up based on the greatest length of prior history. This approach can be useful to improve prediction accuracy, as a hit based on longer history may be more likely to accurately predict the behaviour, but looking up tables based on shorter history can be useful in cases when there is a miss in the longer history tables or when branches have an outcome which is independent of program flow a long time ago. For example, a TAGE (tagged-geometric) scheme can be used for the history-dependent table 47.

Each entry of the history-dependent table includes, in this example:
- a tag field 220 used for lookups to detect whether there is a hit or miss for the corresponding entry, which is similar in function to the tag in the history-independent table, but is based on history-dependent lookup information rather than history-independent lookup information;
- a type field 232 which serves the same purpose as in the history-independent table, to distinguish entries corresponding to the predicated-loop-terminating branch instruction from entries corresponding to regular branches;
- a target address field 221 which provides a prediction of the target address for regular branches. As in the history-independent table 42, this target address field 221 can be reused to provide the maximum and average counters and confidence indications 222, 224, 226, 228 for predicting the number of loop iterations for the predicated-loop-terminating branch instruction (the hint information 230 is not required for the history-dependent table 47).
- a usefulness counter 234 which can be used to manage replacement of entries in the history-dependent table 47, based on how long it has been since the entry was used for a prediction. This can be useful to allow eviction of entries which were useful for a time, when the entry provided confident predictions for a given branch, but which are now no longer useful because program flow has moved on and so that given branch no longer arises. Any known usefulness tracking scheme can be useful usefulness counter 234.

While FIG. 11 shows, for both tables 42, 47, the loop iteration prediction state information 222, 224, 226, 228, 230 being stored in the field 221 of the entry of the table 42, 47 portion of bits of the entry which would otherwise provide the predicted target address 221 for regular branches, other approaches could provide the loop iteration prediction state information in a separate field from the target address 221. For example, this could be useful if the predicated-loop-terminating branch instruction is separate from other instructions representing the loop body functions of the predicated loop, so that the branch target address of the predicated-loop-terminating branch instruction is no longer implicit and it is useful to indicate a separate target address field.

While FIG. 11 shows an approach which combines both the history-independent table 42 (used to predict relatively simple branches whose behaviour does not change significantly from one instance to another) and a history-dependent table 47 (for which the use of history information allows a more accurate prediction in the case of branches which vary in behaviour depending on earlier program flow), it is not essential to provide both types of table and other examples may provide only one (either history-independent, or history-dependent). The hint information 230 can be omitted if there is no history-dependent table 47.

Hence, in general there is at least one table 42, 47 which can provide, in an entry corresponding to a given set of lookup information corresponding to a predicated-loop-terminating branch instruction, information 222, 224, 226, 228 (230) for predicting the number of loop iterations to fetch for the loop including the predicated-loop-terminating branch instruction.

Figure 12:
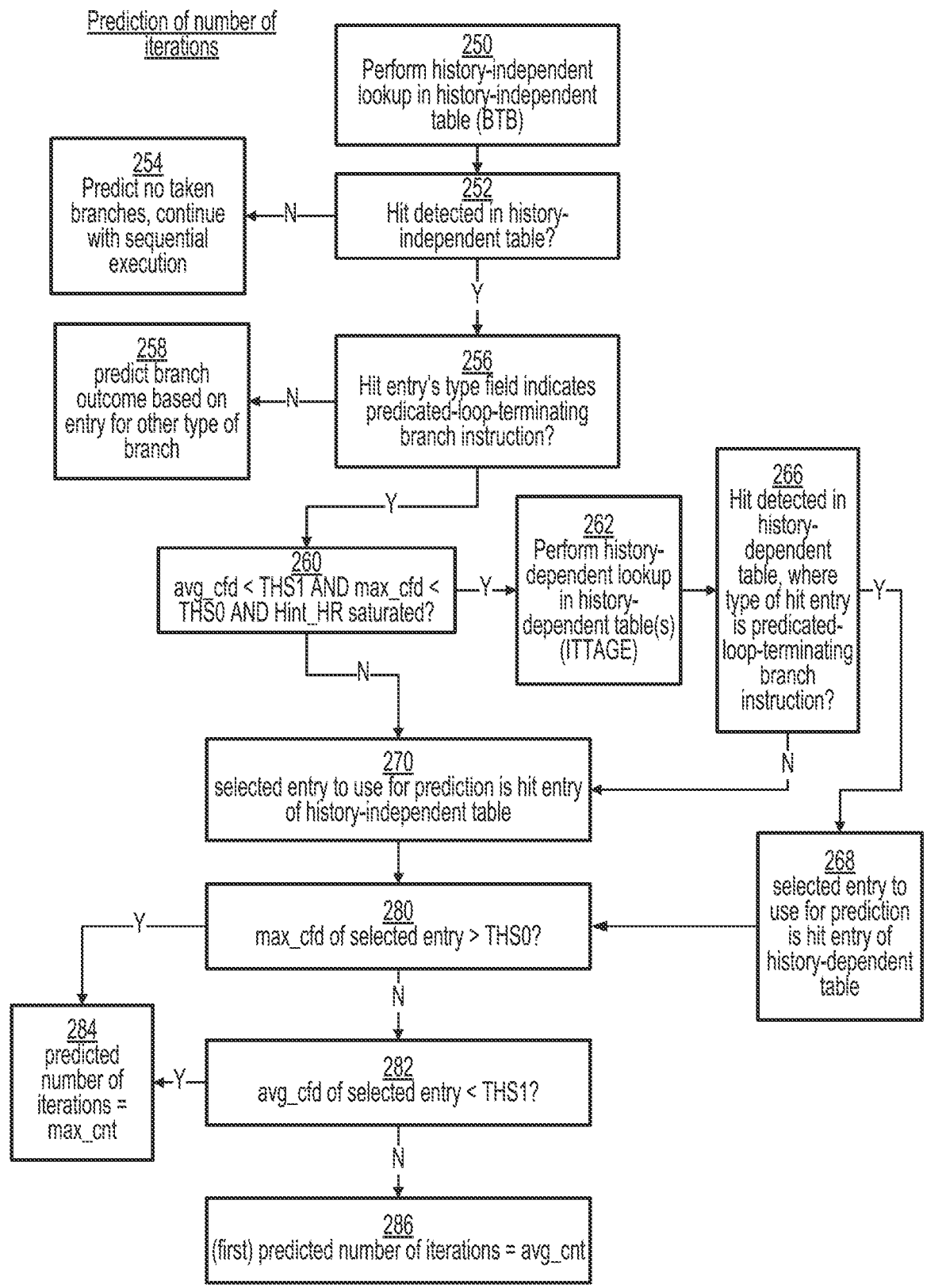
FIG. 12 illustrates a method for determining a predicted number of iterations based on the prediction state information.

FIG. 12 is a flow diagram showing how this information can be used to determine a prediction of the number of iterations. At step 250, the branch predictor 40 (an example of prediction circuitry) performs a history-independent lookup in the history-independent table (BTB) 42 based on history-independent lookup information derived from an address (program counter, PC) associated with the point of program flow for which the lookup is performed. At step 252, based on the comparison of the history-independent lookup information with the tag fields 220 of a set of entries of the history-independent table 42, the branch predictor 40 determines whether a hit was detected in the history-independent table 42. The set of entries looked up in the history-independent table 42 could be all the entries of the history-independent table, in a fully-associative table implementation, or could be a limited subset of entries selected based on the history-independent lookup information, in a set-associative table implementation. If a miss is detected in the history-independent table 42, so that there is no valid entry which has tag information 220 corresponding to the history-independent lookup information, then at step 254 the branch predictor predicts that there are no taken branches in the block of one or more instructions corresponding to the history-independent lookup information, and so indicates to the fetch stage 6 that fetching should continue based on sequential execution with no branching. The address of the next sequentially fetched block of instructions becomes the PC used to perform the next history-independent lookup in a subsequent cycle.

If a hit is detected in the history-independent table, then at step 256 the branch predictor 40 determines whether the type field 232 indicates that the hit entry corresponds to the predicated-loop-terminating branch instruction. If not, then at step 258 the branch outcome (e.g. branch target address, in the case of a BTB) is predicted based on the hit entry corresponding to another type of branch other than the predicated-loop-terminating branch instruction. The address of the next sequentially fetched block of instructions becomes the predicted target address of the branch, and this address is used as the PC for the next history-independent lookup in a subsequent cycle of prediction.

If the hit entry does correspond to a predicated-loop-terminating branch instruction, then at step 260 branch predictor 40 determines whether all of the following conditions are satisfied:
  first confidence (indicated by average confidence, avg_cfd, 224) is lower than a first threshold THS1;
  second confidence (indicated by maximum confidence, max_cfd, 228) is lower than a second threshold THS0; AND
  the hint information 230 has reached saturation. If the hint information is a single-bit, then this may be equivalent to checking whether the hint information is set. If the hint information is a multi-bit field, then this may be equivalent to checking whether the hint field has reached its maximum value.

The comparisons used to determine whether the first/second confidence is lower than the first/second confidence could be any of: a greater than comparison, a less than comparison, a greater than or equal comparison, or a less than or equal comparison, depending on the way in which the level of confidence is encoded by the confidence parameters 224, 228 (e.g. different encoding schemes can be used which may differ in terms of whether the highest confidence is represented by the largest numeric value of the confidence parameter 224 or the smallest numeric value of the confidence parameter). Hence, in the comparisons of the first confidence and second confidence indicated above, "lower" is taken to mean that the level of confidence indicated by parameter 224 or 228 is less confident than the level of confidence indicated by the threshold, irrespective of whether that lower level of confidence is expressed using a higher or lower numeric value than a numeric value corresponding to the threshold.

If all of the conditions checked at step 260 are satisfied, then this indicates that neither the average counter 222 nor the maximum counter 226 can provide a confident prediction and the hint information 230 has previously been set to indicate that a better prediction may be available from the history-dependent table 47. Therefore, at step 262, the branch predictor 40 performs a history-dependent lookup in the history-dependent table(s) 47 (e.g. ITTAGE) based on history-dependent lookup information derived from the PC address and the history information from history storage 100. At step 266, the branch predictor 40 determines whether hit is detected in the history-dependent table, based on a comparison of the history-dependent lookup information and the tag fields 220 of a set of looked up entries (again this could be all the entries of the table 47 or a limited subset of entries). If the history-dependent lookup determines there is a hit against a hit entry of the history-dependent table 47, then at step 268 the selected entry to use for generating the prediction of the number of iterations is determined to be the hit entry of the history-dependent table 47.

On the other hand, if either the history-dependent lookup is performed but detects a miss so that there is no valid entry in the history-dependent table 47 corresponding to the history-dependent lookup information, or at step 260 it was determined that either the first confidence is greater than or equal to the first threshold, the second confidence is greater than or equal to the second threshold, or the hint information 230 has not yet reached saturation, then at step 270 the branch predictor 40 determines that the selected entry to use for generating the prediction of the number of iterations is the hit entry of the history-independent table 42.

Regardless of whether the selected entry to use for the prediction is the hit entry of the history-independent table 42 or the hit entry of the history-dependent table 47, at step 280 the branch predictor 40 determines whether the second confidence (maximum confidence indicated by maximum confidence parameter 228) of the selected entry is greater than the second threshold THS0. If so, then at step 284 the predicted number of iterations is determined to be the number of iterations indicated by the maximum iteration prediction parameter, max_cnt, 226. On the other hand, if at step 282 the branch predictor determines that the first confidence (average confidence indicated by average confidence parameter 224) is less than the first threshold THS1, then again at step 284 the predicted number of iterations is determined to be the number of iterations indicated by the maximum iteration prediction parameter 226. If maximum confidence is less than or equal to the second threshold THS0 and average confidence is greater than or equal to the first threshold THS1, then at step 286 the predicted number of iterations is the number of iterations indicated by the first iteration prediction parameter (average counter), avg_cnt, 222. Hence, the maximum prediction is used if either maximum confidence is high or average confidence is low, but if maximum confidence is low and average confidence is high then the average prediction is used.

Based on the predicted number of iterations determined at step 284 or 286, the branch predictor controls the fetch stage 6 to start fetching the predicted number of iterations. For a subsequent prediction cycle, the next PC to use for the lookup is the PC associated with the next sequential instruction after the predicated loop associated with the predicated-loop-terminating branch instruction.

Regardless of whether the actual prediction of the number of iterations used for controlling fetching is based on the average counter 222 or the maximum counter 226, the prediction which would be generated if the average counter 222 is used is referred to as the first predicted number of iterations.

If no history-dependent table 46 is supported, steps 260, 262, 266, 268 can be omitted, and the prediction is based on the hit entry of the history-independent table as shown at steps 270 and 280-286.

If no history-independent table 42 is supported for prediction of the number of iterations for the predicated-loop-terminating branch, the method may start at step 262 and if there is a miss in the history-dependent table 46 at step 266 or a hit in an entry corresponding to a branch other than the predicated-loop-terminating branch instruction, the method may proceed to step 254 to predict there are no taken branches or to step 258 to predict the branch outcome for the other type of branch, while if a hit detected at step 266 for an entry corresponding to a predicated-loop-terminating branch, then the method proceeds to steps 268 and 280-286 as shown. In this case, steps 250, 252, 256, 260, 270 may be omitted.

Figure 13:
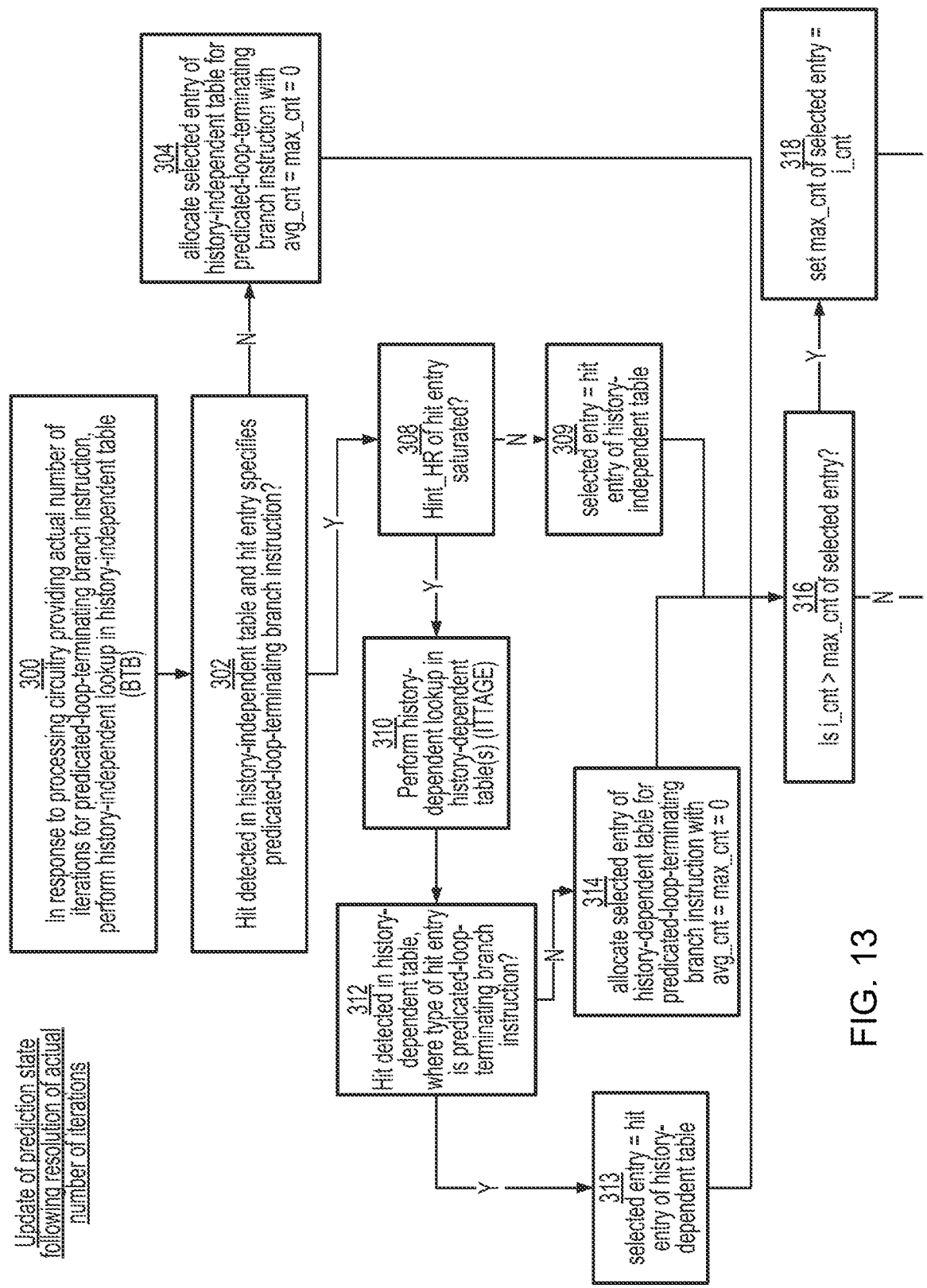
FIG. 13 illustrates a method for updating prediction state information following resolution of the actual number of iterations.
Figure 13:
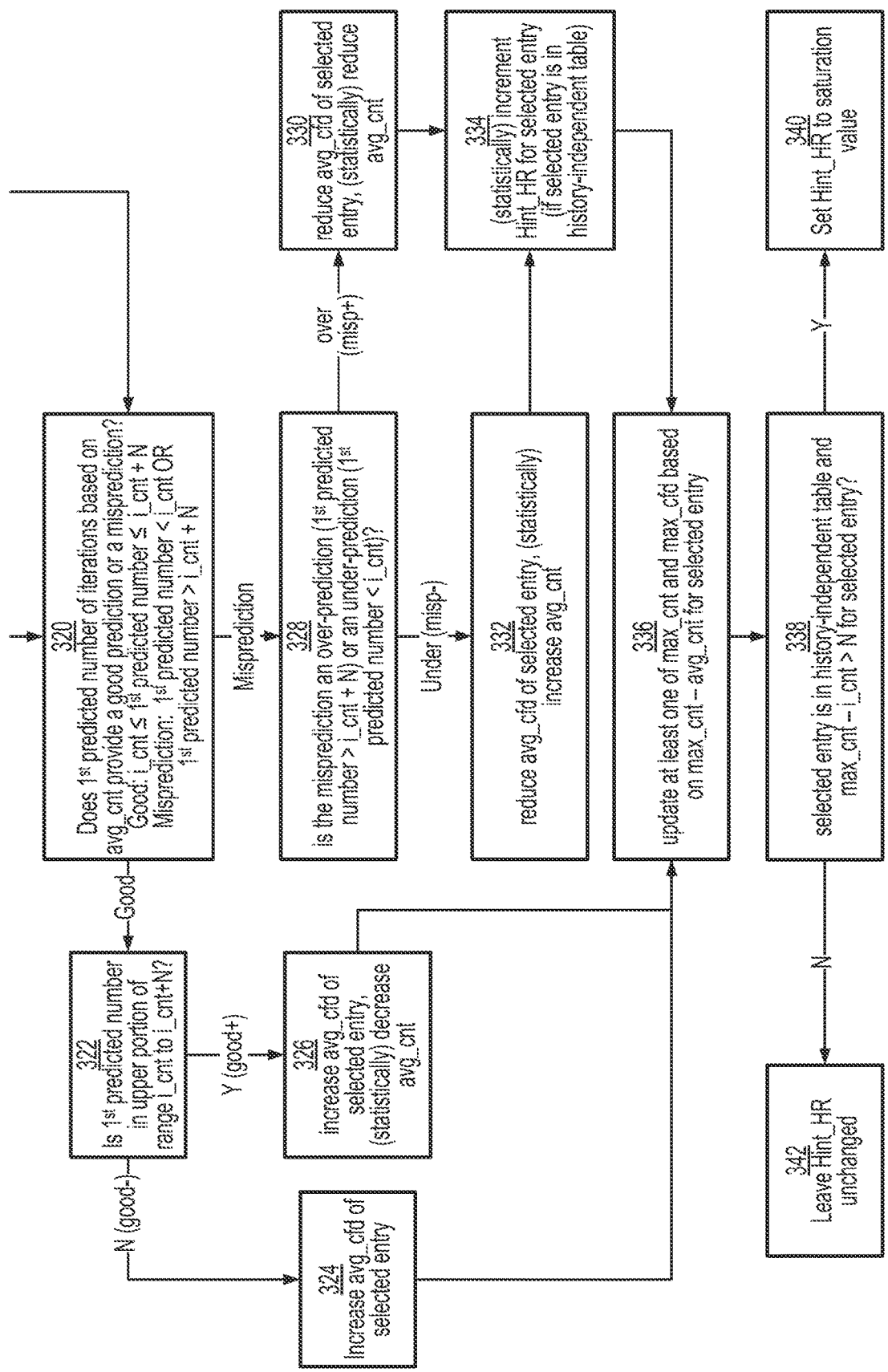

FIG. 13 is a flow diagram illustrating a method for updating the prediction state information stored in tables 42, 47 following resolution (at the execute stage 16) of the actual number of iterations for a predicated-loop-terminating branch instruction.

At step 300, in response the processing circuitry 16 providing the actual number of iterations for the predicated-loop-terminating branch instruction, a history-independent lookup is performed in the history-independent table (BTB) 42 based on history-independent lookup information derived from the PC of the resolved branch instruction (the history-independent lookup information is independent of the history information maintained by history storage 100). At step 302 the branch predictor determines whether a hit was detected in the history-independent table 42 and whether the hit entry has the type field 232 specifying a predicated-loop-terminating branch instruction. If there is a miss or the hit entry does not correspond to a predicated-loop-terminating branch instruction, then at step 304 a new entry can be allocated for the predicated-loop-terminating branch instruction. A victim selection process may be used to select which entry is allocated, according to any known cache replacement policy. The selected entry is initialised with both the average and maximum counters 222, 226 indicating a predicted number of iterations of 0, and the average and maximum confidence 224, 228 initialised to an initial value, e.g. the value indicating the lowest level of confidence. The newly allocated entry is referred to as the "selected entry" below for the prediction state updating steps.

If at step 302 a hit was detected in the history-independent table 42 and the type field 232 specifies the hit entry corresponds to a predicated-loop-terminating branch instruction, then at step 308 the branch predictor determines whether the hint field 230 is saturated (e.g. whether the hint bit flag is set, or whether a hint counter is at its maximum value). If the hint field is not saturated then at step 309 the "selected entry" to be updated with prediction state based on the resolved branch is the hit entry of the history-independent table 42.

If the hint field 230 of the hit entry of the history-independent table 42 is saturated, then at step 310 the branch predictor 40 performs the history-dependent lookup in one or more history-dependent tables 47, based on history-dependent lookup information derived from the PC of the resolved branch instruction and the history information from the history storage 100. If at step 312 it is determined that a hit is detected in the history-dependent table and the type 232 of the hit entry indicates the predicated-loop-terminating branch instruction, then at step 313 the "selected entry" to be updated is the hit entry of the history-dependent table 47. If a miss is detected in the history-dependent table 47 or a hit is detected against an entry which is of a type other than the predicated-loop-terminating branch instruction, then at step 314 a selected entry is allocated for the predicated-loop-terminating branch instruction with fields 222, 224, 226, 228 initialised as explained above for step 304, and the "selected entry" to be updated is the newly allocated entry.

Hence, regardless of whether the history-dependent lookup is performed, and whether a hit or miss is detected in either the history-independent table or the history-dependent table, a selected entry is identified which is to be updated with prediction state information corresponding to the resolved number of iterations for the predicated-loop-terminating branch instruction. This selected entry could be a newly allocated entry or an existing entry and could be either in the history-independent table 42 or in the history-dependent table 47. Again, it is possible that one of the history-independent table 42 and the history-dependent table 47 could be omitted, in which case the corresponding steps of looking up the omitted table can be omitted from FIG. 13 and the selected entry would the newly allocated or hit entry identified in the other type of table.

At step 316, the branch predictor 40 determines whether the actual number of iterations, i_cnt, which was resolved by the execute stage 16 based on operands of the first loop iteration reaching the execute stage for the predicated loop including the predicated-loop-terminating branch instruction, is greater than the number of iterations currently indicated by the maximum counter 226 of the selected entry. If so, then at step 318 the maximum counter 226 is updated to indicate a number of iterations equal the actual number of iterations i_cnt.

Regardless of whether or not the maximum counter 226 is updated, at step 320 the branch predictor 40 determines whether the first predicted number of iterations (which as discussed above is based on the current value of the average counter 222 regardless of whether the prediction previously made for this predicated-loop-terminating branch instruction was derived from the average counter 222 or the maximum counter 226) provides a good prediction or a misprediction. Here, as in the approach shown in FIG. 10, a good prediction occurs when the first predicted number is within the good enough range i_cnt to i_cnt+N and a misprediction occurs when the first predicted number is either less than i_cnt or greater than i_cnt+N.

If the first predicted number of iterations based on the average counter (first iteration prediction parameter) 222 would provide a good prediction, then at step 322 the branch predictor determines whether the first predicted number is in the upper portion of the good enough range. For example, the upper portion may be considered to be the top half of the good enough range, from i_cnt+N/2 to i_cnt+N. Other examples may set the lower boundary of the upper portion of the range at a point other than halfway through the range.

If the first predicted number is not in the upper portion of the good enough range (this is denoted in shorthand as a good− prediction below), then at step 324 the first confidence (average confidence avg_cfd indicated by average confidence parameter 224) of the selected entry is increased to reflect that a good prediction occurred, but there is no need to adjust the average counter 222 as the first predicted number is behaving well and is not too high above the actual number of iterations i_cnt.

Figure 14:
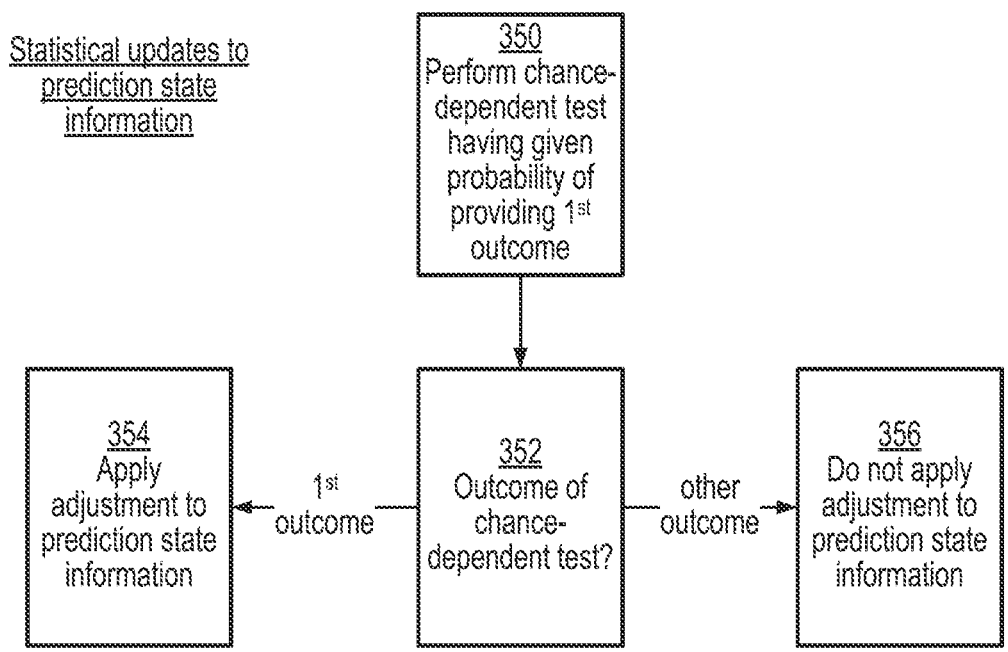
FIG. 14 illustrates performing a statistical update to prediction state information.

If the first predicted number is in the upper portion of the good enough range (this is denoted in shorthand as a good+ prediction below), then at step 326 the first confidence (average confidence 224) of the selected entry is increased as at step 324 to reflect another good prediction, but also an adjustment operation to apply a (statistical) decrease to the average counter, avg_cnt, 222 of the selected entry is performed. In some cases, the decrease in the average count may always be applied when a good+ prediction is identified. However, as shown in FIG. 14 discussed further below, some implementations may apply a statistical decrease, so that the adjustment to decrease the average counter may not always be applied depending on the outcome of a chance-dependent test. By, at least some of the time, decreasing the average counter avg_cnt 222 when a good+ prediction occurs, this makes it less likely that the prediction will be in the upper portion of the good enough range on subsequent occasions, which is useful to reduce the number of unnecessary loop iterations executed with predication. This can help to save power.

If at step 320 it was determined that a misprediction occurred, then at step 328 the branch predictor 40 determines whether the misprediction is an over-misprediction (misp+, for which the first predicted number is greater than i_cnt+N), or an under-misprediction (misp−, for which the first predicted number is less than the actual number of iterations i_cnt resolved by the execute stage 16).

If at step 330, it is determined that an over-misprediction (misp+) occurs, then at step 330 the average confidence, avg_cfd, 224 is reduced and an adjustment operation is performed to (statistically) reduce the average counter 222, to make it less likely that over-mispredictions will occur again in future. Again, FIG. 14 shows more detail for the statistical approach to applying the adjustment.

If the misprediction was an under-misprediction (misp−), this is the performance-critical case where a flush would be needed. At step 332, the average confidence 224 is reduced for the selected entry and also an adjustment operation is performed to (statistically) increase the average counter 222, making it less likely that the under-misprediction would arise again in future.

Regardless of whether the misprediction was an over-misprediction or an under-misprediction, at step 334, if the selected entry was in the history-independent table 42, an adjustment operation is performed to (statistically) increment the hint field 234 the selected entry (the hint field is a saturating counter so it cannot be incremented past its saturation value).

Regardless of whether the prediction was a good prediction or a misprediction, at step 336 a selective update is made to at least one of the maximum counter 226 and the maximum confidence 228 of the selected entry based on the difference between the maximum counter 226 and the average counter 222 for the selected entry. More particularly, it can be useful if the update is made to the maximum counter 226, although other examples could apply the update to the confidence 228. There are different ways in which the difference between the maximum counter and the average counter can be used to control the update. In some examples, the difference between the maximum counter and the average counter may be compared with threshold and if the difference is larger than the threshold then the update may be applied to reduce the maximum number of iterations indicated by the maximum counter 226 and/or reduce the confidence indicated by the maximum confidence 228. Alternatively, the amount by which the maximum counter 226 and/or confidence 228 is reduced may be scaled based on the difference between the maximum counter 226 and the average counter 222 for the selected entry. In general, applying a reduction to the maximum or its related confidence when the difference between the maximum and the average counter is high can be useful to avoid predictions based on extremely high maximums persisting for a long time after the iteration count behaviour has returned to a lower level, which can reduce the number of unnecessary iterations fetched.

At step 338 the branch predictor 40 also checks, if the selected entry is in the history-independent table 42, whether the difference between the maximum counter for the selected entry and the actual number of iterations, i_cnt, is greater than N. If so, then this an indication that the dynamic range within which the number of loop iterations varies from one instance of the predicated-loop-terminating branch instruction at a given PC to another is greater than N, so that it is difficult to use a single entry to learn predictions within the good enough range using a history-independent lookup. Hence, if the selected entry is in the history-independent table 42 and the difference between the maximum counter 226 and the actual number of iterations i_cnt is greater than N, at step 340 the hint field 230 of the selected entry is set to its saturation value, so that on future predictions the history-independent table can be used. Although not shown in FIG. 13, following step 340 the branch predictor may then proceed to allocate an entry in the history-dependent table as at step 314 and update the prediction state of that entry based on that entry being the selected entry for steps 316-332. Similarly, if the hint field had become saturated in the update made at step 334, this could similarly trigger a new allocation of an entry in the history-dependent table 47 as at step 314 with the prediction state of that entry being updated according to the steps 316-332.

On the other hand, if at step 338 either the selected entry is in the history-dependent table 47 or the difference between the maximum counter 226 and the actual number of iterations i_cnt is less than or equal to N, then at step 342 the hint field 230 of the selected entry can be left unchanged.

FIG. 14 is a flow diagram illustrating a statistical update to prediction state information which can be applied at one of steps 326, 332, 330, 334 which apply statistical increases or decreases to one of the parameters 222, 230 of the predication state information. Hence, at all of these steps, an adjustment operation is performed to selectively apply an adjustment to prediction state information. The adjustment could be either an increase or decrease in the parameter being adjusted, and could be by different increment or decrement amounts depending on which parameter is being adjusted and the scenario (good+, misp−, misp+) causing the adjustment operation to be performed.

At step 350 the branch predictor 40 performs a chance-dependent test. The chance-dependent test may be analogous to a dice roll or a lottery draw, providing a given probability of having the first outcome, where it is a matter of chance whether the first outcome will occur for any given instance of performing the test. Hence, even if two instances of prediction state updates occur based on identical parameters (e.g. same entry being updated, same initial state of the entry and same actual number of iterations resolved for that update), the chance-dependent test may nevertheless provide different outcomes on different occasions. Providing some statistical variation in whether the update is applied can be helpful to provide some tolerance for occasional outliers where an unusually low/high number of iterations occurs, without disrupting prediction state which works well for most other occurrences of the predicated-loop-terminating branch instruction. By using a statistical update, a common behaviour occurring on many occasions is more likely to influence the prediction state than a rare behaviour occurring only a few times.

The chance-dependent test could be implemented in many different ways. For example, a random number generator (or pseudorandom number generator) could be used to generate a (pseudo) random number with a certain number of bits, and if that number has a particular value then the test is considered to provide the first outcome while other values of the (pseudo) random number are considered to provide other outcomes. The probability of the first outcome occurring therefore depends on the number of bits in the (pseudo) random number.

Another approach can be that a counter is incremented or decremented each time a particular event occurs. The current value of the counter is checked when the chance-dependent test needs to be performed for a given prediction state update operation, and if the counter (or a subset of bits of the counter) has a particular value then the test is considered to provide the first outcome while other values of the counter are considered to provide other outcomes. The event which triggers the counter to advance could be any event and does not need to be related to the prediction of the number of iterations of the fetching process. For example, there may be an existing counter in the system which counts events which are completely uncorrelated with the loop iteration prediction, such as the number of elapsed processing cycles, the number of executed instructions, etc. Alternatively, the event could be a branch predictor related event, such as a lookup to one of the prediction tables 42, 44, 47. Regardless of what event is counted by the counter, by sampling a subset of bits of such a counter (e.g. the least significant N bits, which are likely to have a more even probability distribution in value than more significant bits), a value may be obtained which has a relatively even probability of having any particular numeric value, with the number of bits sampled defining the probability with which the first outcome (a particular value of the sampled bits) occurs.

Similarly, other data values present on the system (not necessarily counters) could have bits sampled from the data value for use in the chance-dependent test. Again, the number of bits sampled for the chance-dependent test affects the probability with which the sampled bits have a certain value corresponding to the first outcome.

Regardless of how the chance-dependent test is implemented, at step 352 the prediction circuitry 40 determines the outcome of the chance-dependent test. If the outcome is the first outcome, then at step 354 the required adjustment is applied to the relevant item of prediction state information (e.g. the average counter 222 or hint field 230 is updated as shown at steps 326, 332, 330, 334). At step 356, the adjustment is suppressed (not applied) if the outcome of the chance-dependent test is another outcome other than the first outcome.

The probability of the chance-dependent test having the first outcome can be different for the different instances (steps 326, 332, 330, 334) at which statistical updates of prediction state are made.

In one specific example, an algorithm for prediction generation and prediction state updates can be as follows, where good predictions and mispredictions are defined as follows, where pred(i_cnt) indicates the first predicted number of iterations predicted based on the average counter 222, and i_cnt is the actual number of loop iterations resolved:

Misprediction: pred(i_cnt) not in [i_cnt, i_cnt+N]
        Misprediction by excess: pred(i_cnt)>i_cnt+N (misp+)
        Under-predicting misprediction: pred(i_cnt)<i_cnt (misp−)
    Good prediction: pred(i_cnt) in [i_cnt, i_cnt+N]
        Good prediction low: pred(i_cnt) in [i_cnt, i_cnt+N/2]: (good−)
        Good prediction high: pred(i_cnt) in [i_cnt+N/2; i_cnt+N]: (good+)

(it can be a design choice whether pred(i_cnt)=i_cnt+N/2 is treated as good− or good+).

Prediction generation logic:
final_pred_s=((max_cfd>THS0)||avg_cfd<THS1))? max_cnt: avg_cnt If (avg_cfd<THS1) && (max_cfd<THS0) && Hint_HR:
   launch_pred_with_history-independent_table
Update logic:
max_cnt:
   set to max iteration count used by instruction lately
   Slightly decremented statistically based on difference between max_cnt and avg_cnt
Avg_cnt:
On misp−:
   avg_cnt+=α; //Statistically ¼ or ⅛ times
   avg_cfd−=β;
On misp+:
   avg_cnt−=α; //Statistically 1/16 times
   avg_cfd−=β;
On good−:
   avg_cfd+=β;
On good+:
   avg_cfd+=β;
   avg_cnt−=α; //Statistically 1/32 times
Here, the increment/decrement amount α for adjusting avg_cnt can be proportional to |i_cnt−avg_cnt| or can be a fixed value.
The increment/decrement amount β for adjusting confidence is a parameter chosen by the system designer depending on how fast confidence is desired to be adjusted in response to good/bad predictions. In some examples, specific values for β could be used for the different confidence update scenarios (misp−, misp+, good−, good+)—e.g. the size of the decrement on misp− could be larger than the size of the increment or decrement on good−, good+ or misp+, given that under-predictions are the most problematic for performance.
Hint update logic for updating hint information 230 (e.g. the hint could be a 3-bit counter):
   Hint incremented statistically (e.g. 1/16 times) on mispredictions.
   When saturating, start launching the HR correlation predictor (ITTAGE like predictor)
   The Hint can be set also when: Max_cnt—resolves>N i.e. the range is too large to be totally predicted by a single entry without a flush.
Of course, the specific probabilities for the prediction updates shown above are just one example, and other examples could use different probabilities for the chance-dependent test shown in FIG. 14.

Figure 15:
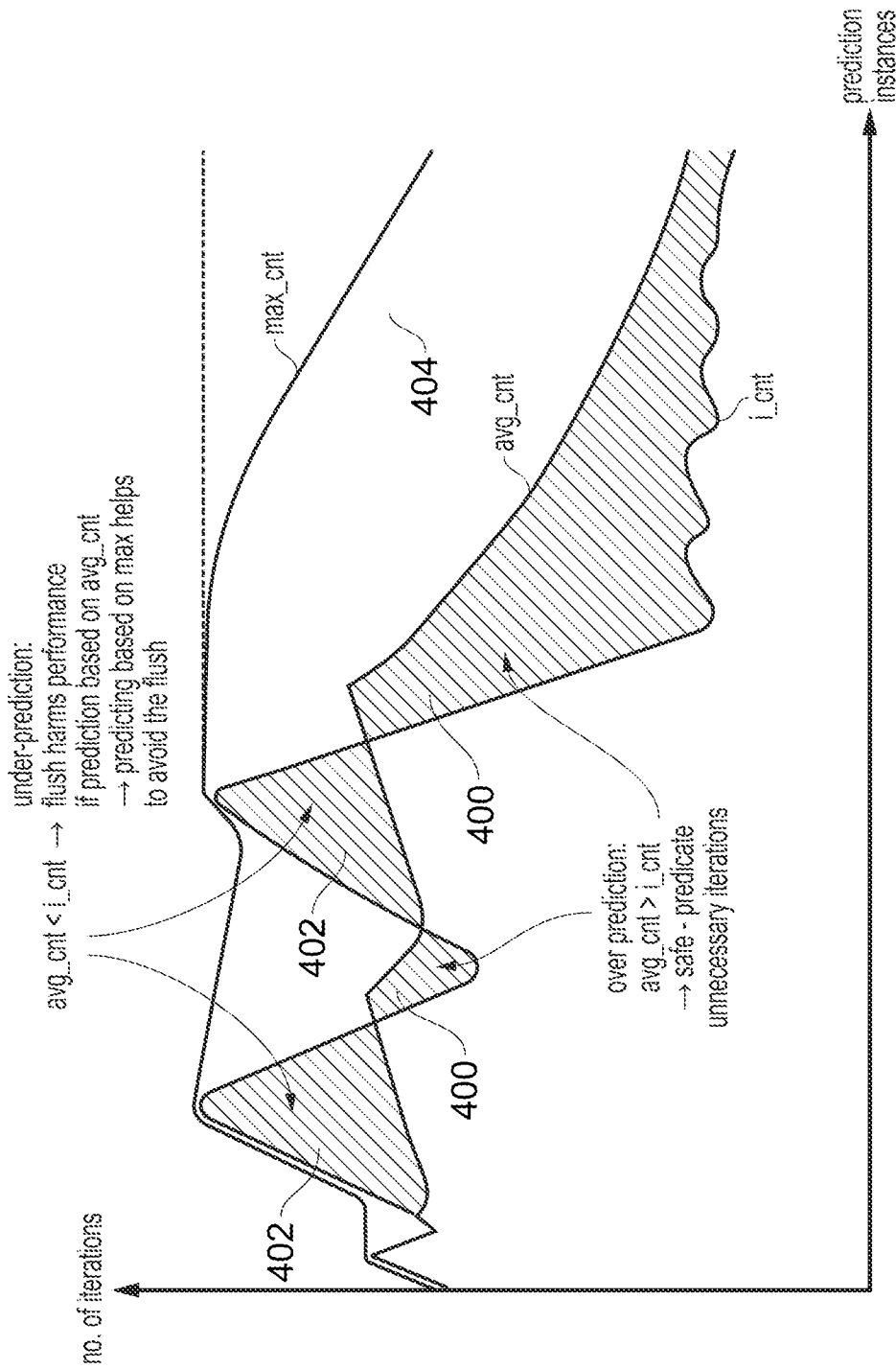
FIG. 15 illustrates why use of a maximum iteration prediction parameter for determining the prediction can help to reduce the performance impact caused by flushes.

FIG. 15 schematically illustrates an example showing why use of the maximum counter can be beneficial on occasion. FIG. 15 is a graph tracking the predicted number of iterations predicted based on the average counter (avg_cnt) and maximum counter (max_cnt) respectively against the actual number of iterations (i_cnt) resolved by the execute stage 16, across a number of prediction instances when a prediction is made and the actual number of iterations is subsequently resolved. The actual number of iterations, i_cnt, goes up and down as the behaviour changes from time to time. The average count, avg_cnt, 222 responds more slowly to changes in the observed actual number of iterations, so rises gradually after a rise in i_cnt and drops off gradually after a drop-in i_cnt. The shaded areas of the graph indicate the difference between the actual number i_cnt and the first predicted number based on avg_cnt 222. Regions 400 represent prediction instances where the first predicted number of iterations based on avg_cnt 222 provides an over-prediction, so that a number of unnecessary loop iterations fetched, but this is safe because the predication applied to the micro-operations within the loop prevents the unnecessary loop iterations having any incorrect architectural effect.

However, in the regions 402 the first predicted number of iterations based on avg_cnt 222 provides an under-prediction, causing too few iterations to be fetched so that the subsequent instructions after the loop are incorrectly fetched too early. As these subsequent instructions could have an outcome which varies depending on the missing iterations, a flush is performed to flush the incorrectly fetched instructions (and associated micro-operations) from the pipeline and resume fetching from the correct instructions, fetching at least one further iteration of the loop. The flush harms performance if the prediction is based on the avg_cnt 222.

In these regions 402, where the actual number of iterations i_cnt has just risen rapidly, that the avg_cnt 222 struggles to keep up and so risks a relatively long sequence of under-predictions if used for controlling the fetching. As shown in FIG. 15, the maximum counter, max_cnt, 226 can react much faster to the sudden increase in i_cnt (the first instance when i_cnt>avg_cnt may still generate an under-prediction, but in response to that misprediction the maximum counter can then be updated making a subsequent under-prediction less likely). Hence, on under-prediction, decreasing confidence in the average counter and increasing the maximum and the associated maximum confidence can help to reduce the number of flushes required in subsequent predictions. Hence, in the regions 402 of FIG. 15, the maximum counter 226 may be used to provide the prediction for controlling fetching, instead of the average counter 222, until the average counter 222 regains sufficient confidence 224 to be used for predictions once more.

The final portion 404 of FIG. 15 shows a period when, after previously having been high, the actual number of iterations drops by a large amount and the average counter 222 follows, with a time lag. However, if the maximum counter, max_cnt, remained at the true maximum seen at any point in the past, then as shown in the dotted line in FIG. 15, this would risk the maximum counter remaining a long distance apart from the average counter. This can be a problem in some scenarios because if there was a slight increase in the actual number of iterations, i_cnt, seen for some instances of the predicated loop, so that the actual number of iterations i_cnt starts to exceed the first predicted number based on the average counter 222 again (similar to regions 402), then if the maximum counter 226 is a long way apart from the average counter 222, this would risk generating a very large number of unnecessary loop iterations in an over-prediction which, although not a problem from an architectural point of view, may waste pipeline slots and consume extra power in being executed while fully predicated. Therefore, as shown in the solid line labelled max_cnt, during the period 404 it may be useful to gradually reduce the maximum count indicated by max_cnt 226 over time, if the difference between max_cnt and avg_cnt is high. This is the reason why step 336 of FIG. 13 updates max_cnt (or alternatively, max_cfd) based on max_cnt−avg_cnt, to reduce the chance of fetching being based on a prediction based on the maximum counter being a long way above the actual iteration count.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
    processing circuitry to perform processing operations in response to decoded instructions; and
    prediction circuitry to predict, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations;
    in response to the processing circuitry resolving an actual number of iterations of the fetching process, the prediction circuitry is configured to adjust the prediction state information used to predict the number of iterations of the fetching process, based on whether a first predicted number of iterations, predicted based on a first iteration prediction parameter of the prediction state information, provides a good prediction or a misprediction;
    the prediction circuitry is configured to determine that the first predicted number provides the good prediction when the first predicted number of iterations is in a range i_cnt to i_cnt+N, where i_cnt is the actual number of iterations and N 1; and the prediction circuitry is configured to determine that the first predicted number provides the misprediction when the first predicted number of iterations is outside the range i_cnt to i_cnt+N.

2. The apparatus according to clause 1, in which the prediction circuitry is configured to:
    increase a confidence associated with the first iteration prediction parameter when the first predicted number of iterations is determined to provide the good prediction; and
    decrease the confidence associated with the first iteration prediction parameter when the first predicted number of iterations is determined to provide the misprediction.

3. The apparatus according to any of clauses 1 and 2, in which in response to a determination that the first predicted number of iterations provides the misprediction, the prediction circuitry is configured to perform an adjustment operation for applying an adjustment to the first iteration prediction parameter, where:
    for a misprediction where the first predicted number of iterations is below the range i_cnt to i_cnt+N, the adjustment is to increase a number of iterations indicated by the first iteration prediction parameter; and
    for a misprediction where the first predicted number of iterations is above the range i_cnt to i_cnt+N, the adjustment is to decrease a number of iterations indicated by the first iteration prediction parameter.

4. The apparatus according to clause 3, in which the adjustment operation comprises:
    determining whether a chance-dependent test, which has a given probability of providing a first outcome, provides the first outcome;
    applying the adjustment to the first iteration prediction parameter in response to a determination that the chance-dependent test provides the first outcome; and
    suppressing applying the adjustment to the first iteration prediction parameter in response to a determination that the chance-dependent test provides another outcome other than the first outcome.

5. The apparatus according to any of clauses 1 to 4, in which in response to a determination that the first predicted number of iterations provides the good prediction and the first predicted number of iterations is in an upper portion of the range i_cnt to i_cnt+N, the prediction circuitry is configured to perform an adjustment operation for applying an adjustment to the first iteration prediction parameter, where the adjustment is to decrease a number of iterations indicated by the first iteration prediction parameter.

6. The apparatus according to any of clauses 1 to 5, in which the first iteration prediction parameter indicates an average number of iterations for the fetching process.

7. The apparatus according to any of clauses 1 to 6, in which the prediction circuitry is configured to predict the number of iterations for the given instance of the fetching process based on the first iteration prediction parameter and a maximum iteration prediction parameter indicative of a maximum number of iterations for the fetching process.

8. The apparatus according to clause 7, in which the prediction circuitry is configured to determine, based on a first confidence associated with the first iteration prediction parameter and a second confidence associated with the maximum iteration prediction parameter, whether to use the first iteration prediction parameter or the maximum iteration prediction parameter for determining the predicted number of iterations for the fetching process.

9. The apparatus according to clause 8, in which the prediction circuitry is configured to determine, in response to a determination that the first confidence is lower than a first confidence threshold or the second confidence is higher than a second confidence threshold, that the maximum iteration prediction parameter is to be used for determining the predicted number of iterations.

10. The apparatus according to any of clauses 7 to 9, in which the prediction circuitry is configured to selectively apply, based on a difference between a number of iterations indicated by the maximum iteration prediction parameter and a number of iterations indicated by the first iteration prediction parameter, a reduction to at least one of:
   the maximum number of iterations indicated by the maximum iteration prediction parameter; and
   a confidence associated with the maximum iteration prediction parameter.

11. The apparatus according to any of clauses 1 to 10, in which the prediction circuitry is configured to perform a history-dependent lookup in a history-dependent table of prediction state information based on history-dependent lookup information depending at least on an address associated with a given instance of the fetching process and history information indicative of a history of program flow; and
   in response to determining that a hit entry of the history-dependent table corresponds to the history-dependent lookup information, the prediction circuitry is configured to predict the number of iterations for the given instance of the fetching process based on the prediction state information in the hit entry of the history-dependent table, the hit entry comprising the first iteration prediction parameter.

12. The apparatus according to clause 11, in which the prediction circuitry is configured to perform a history-independent lookup in a history-independent table of prediction state information based on history-independent lookup information depending on the address associated with the given instance of the fetching process; and
   in response to determining that a hit entry of the history-independent table corresponds to the history-independent lookup information, the prediction circuitry is configured to determine based on hint information specified by the hit entry of history-independent table whether to predict the number of iterations based on the prediction state information based on the history-dependent lookup of the history-dependent table or based on the history-dependent lookup of the history-dependent table.

13. The apparatus according to clause 12, in which the prediction circuitry is configured to set the hint information associated with the given instance of the fetching process, based on at least one of:
   a frequency of mispredictions of the number of iterations determined based on the history-independent table for the given instance of the fetching process; and
   whether a difference between a maximum number of iterations encountered for the given instance of the fetching process and the actual number of iterations resolved by the processing circuitry for the given instance of the fetching process is greater than N.

14. The apparatus according to any of clauses 1 to 13, in which the fetching process comprises fetching one or more iterations of at least one instruction to be decoded for processing by the processing circuitry, each iteration predicted to correspond to an instance of a predicated-loop-terminating branch instruction for controlling, based on whether a loop termination condition is satisfied, whether the processing circuitry should process a further iteration of a predicated loop body or process a following instruction to be processed after a final iteration of the predicated loop body, wherein if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an architectural effect of the at least one unnecessary iteration of the predicated loop body.

15. The apparatus of clause 14, in which, following the mispredicted-non-termination branch misprediction, the processing circuitry is configured to:
   flush the at least one unnecessary iteration in response to a determination that a number of unnecessary iterations fetched for processing by the processing circuitry is greater than N;
   and suppress flushing the at least one unnecessary iteration in response to a determination that the number of unnecessary iterations fetched for processing by the processing circuitry is less than or equal to N.

16. The apparatus of any of clauses 14 and 15, in which the predicated loop body comprises operations to:
   determine a variable number of bytes to be processed in a current iteration;
   perform at least one processing operation based on the variable number of bytes determined for the current iteration, the at least one processing operation including at least one of a load operation and a store operation; and update, based on the variable number of bytes, a remaining bytes parameter indicative of a remaining number of bytes to be processed.

17. The apparatus according to any of clauses 14 to 16, in which the predicated loop body comprises a memory copy operation to copy data from a first memory region to a second memory region.

18. The apparatus according to any of clauses 1 to 13, in which the prediction circuitry comprises prefetch prediction circuitry to perform a prefetch prediction to predict, as the number of iterations, a number of blocks of data or instructions to be prefetched from memory into a storage structure associated with the processing circuitry and, based on the prefetch prediction, to perform, as the fetching process, a number of iterations of prefetching.

19. A method for an apparatus comprising processing circuitry to perform processing operations in response to decoded instructions, the method comprising:
- predicting, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations; and
- in response to the processing circuitry resolving an actual number of iterations of the fetching process, adjusting the prediction state information used to predict the number of iterations of the fetching process, based on whether a first predicted number of iterations, predicted based on a first iteration prediction parameter of the prediction state information, provides a good prediction or a misprediction;
- determining that the first predicted number provides the good prediction when the first predicted number of iterations is in a range i_cnt to i_cnt+N, where i_cnt is the actual number of iterations and N≥1; and
- determining that the first predicted number provides the misprediction when the first predicted number of iterations is outside the range i_cnt to i_cnt+N.

A non-transitory computer readable storage medium to store computer-readable code for fabrication of an apparatus comprising:
- processing circuitry to perform processing operations in response to decoded instructions; and
- prediction circuitry to predict, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations;
- in response to the processing circuitry resolving an actual number of iterations of the fetching process, the prediction circuitry is configured to adjust the prediction state information used to predict the number of iterations of the fetching process, based on whether a first predicted number of iterations, predicted based on a first iteration prediction parameter of the prediction state information, provides a good prediction or a misprediction;
- the prediction circuitry is configured to determine that the first predicted number provides the good prediction when the first predicted number of iterations is in a range i_cnt to i_cnt+N, where i_cnt is the actual number of iterations and N 1; and
- the prediction circuitry is configured to determine that the first predicted number provides the misprediction when the first predicted number of iterations is outside the range i_cnt to i_cnt+N.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
- processing circuitry configured to perform processing operations in response to decoded instructions; and
- prediction circuitry configured to predict, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations;
- in response to the processing circuitry resolving an actual number of iterations of the fetching process, the prediction circuitry is configured to adjust the prediction state information used to predict the number of iterations of the fetching process, based on whether a first predicted number of iterations, predicted based on a first iteration prediction parameter of the prediction state information, provides a good prediction or a misprediction;
- the prediction circuitry is configured to determine that the first predicted number provides the good prediction when the first predicted number of iterations is equal to i_cnt, where i_cnt is the actual number of iterations;
- the prediction circuitry is configured to determine that the first predicted number provides the good prediction when the first predicted number of iterations is greater than i_cnt and less than i_cnt+N, where N is an integer and N≥1; and
- the prediction circuitry is configured to determine that the first predicted number provides the misprediction when the first predicted number of iterations is outside the range i_cnt to i_cnt+N.

2. The apparatus according to claim 1, in which the prediction circuitry is configured to:
- increase a confidence associated with the first iteration prediction parameter when the first predicted number of iterations is determined to provide the good prediction; and
- decrease the confidence associated with the first iteration prediction parameter when the first predicted number of iterations is determined to provide the misprediction.

3. The apparatus according to claim 1, in which in response to a determination that the first predicted number of iterations provides the misprediction, the prediction circuitry is configured to perform an adjustment operation for applying an adjustment to the first iteration prediction parameter, where:
- for a misprediction where the first predicted number of iterations is below the range i_cnt to i_cnt+N, the adjustment is to increase a number of iterations indicated by the first iteration prediction parameter; and
- for a misprediction where the first predicted number of iterations is above the range i_cnt to i_cnt+N, the adjustment is to decrease a number of iterations indicated by the first iteration prediction parameter.

4. The apparatus according to claim 3, in which the adjustment operation comprises:
   determining whether a chance-dependent test, which has a given probability of providing a first outcome, provides the first outcome;
   applying the adjustment to the first iteration prediction parameter in response to a determination that the chance-dependent test provides the first outcome; and
   suppressing applying the adjustment to the first iteration prediction parameter in response to a determination that the chance-dependent test provides another outcome other than the first outcome.

5. The apparatus according to claim 1, in which in response to a determination that the first predicted number of iterations provides the good prediction and the first predicted number of iterations is in the range i_cnt+M to i_cnt+N, where M is a positive integer and M<N, the prediction circuitry is configured to perform an adjustment operation for applying an adjustment to the first iteration prediction parameter, where the adjustment is to decrease a number of iterations indicated by the first iteration prediction parameter.

6. The apparatus according to claim 1, in which the first iteration prediction parameter indicates an average number of iterations for the fetching process.

7. The apparatus according to claim 1, in which the prediction circuitry is configured to predict the number of iterations for the given instance of the fetching process based on the first iteration prediction parameter and a maximum iteration prediction parameter indicative of a maximum number of iterations for the fetching process.

8. The apparatus according to claim 7, in which the prediction circuitry is configured to determine, based on a first confidence associated with the first iteration prediction parameter and a second confidence associated with the maximum iteration prediction parameter, whether to use the first iteration prediction parameter or the maximum iteration prediction parameter for determining the predicted number of iterations for the fetching process.

9. The apparatus according to claim 8, in which the prediction circuitry is configured to determine, in response to a determination that the first confidence is lower than a first confidence threshold or the second confidence is higher than a second confidence threshold, that the maximum iteration prediction parameter is to be used for determining the predicted number of iterations.

10. The apparatus according to claim 7, in which the prediction circuitry is configured to selectively apply, based on a difference between a number of iterations indicated by the maximum iteration prediction parameter and a number of iterations indicated by the first iteration prediction parameter, a reduction to at least one of:
   the maximum number of iterations indicated by the maximum iteration prediction parameter; and
   a confidence associated with the maximum iteration prediction parameter.

11. The apparatus according to claim 1, in which the prediction circuitry is configured to perform a history-dependent lookup in a history-dependent table of prediction state information based on history-dependent lookup information depending at least on an address associated with a given instance of the fetching process and history information indicative of a history of program flow; and
   in response to determining that a hit entry of the history-dependent table corresponds to the history-dependent lookup information, the prediction circuitry is configured to predict the number of iterations for the given instance of the fetching process based on the prediction state information in the hit entry of the history-dependent table, the hit entry comprising the first iteration prediction parameter.

12. The apparatus according to claim 11, in which the prediction circuitry is configured to perform a history-independent lookup in a history-independent table of prediction state information based on history-independent lookup information depending on the address associated with the given instance of the fetching process; and
   in response to determining that a hit entry of the history-independent table corresponds to the history-independent lookup information, the prediction circuitry is configured to determine based on hint information specified by the hit entry of history-independent table whether to predict the number of iterations based on the prediction state information based on the history-dependent lookup of the history-dependent table or based on the history-dependent lookup of the history-dependent table.

13. The apparatus according to claim 12, in which the prediction circuitry is configured to set the hint information associated with the given instance of the fetching process, based on at least one of:
   a frequency of mispredictions of the number of iterations determined based on the history-independent table for the given instance of the fetching process; and
   whether a difference between a maximum number of iterations encountered for the given instance of the fetching process and the actual number of iterations resolved by the processing circuitry for the given instance of the fetching process is greater than N.

14. The apparatus according to claim 1, in which the fetching process comprises fetching one or more iterations of at least one instruction to be decoded for processing by the processing circuitry, each iteration predicted to correspond to an instance of a predicated-loop-terminating branch instruction for controlling, based on whether a loop termination condition is satisfied, whether the processing circuitry should process a further iteration of a predicated loop body or process a following instruction to be processed after a final iteration of the predicated loop body, wherein if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an architectural effect of the at least one unnecessary iteration of the predicated loop body.

15. The apparatus according to claim 14, in which, following the mispredicted-non-termination branch misprediction, the processing circuitry is configured to:
   flush the at least one unnecessary iteration in response to a determination that a number of unnecessary iterations fetched for processing by the processing circuitry is greater than N; and
   suppress flushing the at least one unnecessary iteration in response to a determination that the number of unnecessary iterations fetched for processing by the processing circuitry is less than or equal to N.

16. The apparatus of claim 14, in which the predicated loop body comprises operations to:
- determine a variable number of bytes to be processed in a current iteration;
- perform at least one processing operation based on the variable number of bytes determined for the current iteration, the at least one processing operation including at least one of a load operation and a store operation; and
- update, based on the variable number of bytes, a remaining bytes parameter indicative of a remaining number of bytes to be processed.

17. The apparatus according to claim 14, in which the predicated loop body comprises a memory copy operation to copy data from a first memory region to a second memory region.

18. The apparatus according to claim 1, in which the prediction circuitry comprises prefetch prediction circuitry to perform a prefetch prediction to predict, as the number of iterations, a number of blocks of data or instructions to be prefetched from memory into a storage structure associated with the processing circuitry and, based on the prefetch prediction, to perform, as the fetching process, a number of iterations of prefetching.

19. A method for an apparatus comprising processing circuitry to perform processing operations in response to decoded instructions, the method comprising:
- predicting, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations; and
- in response to the processing circuitry resolving an actual number of iterations of the fetching process, adjusting the prediction state information used to predict the number of iterations of the fetching process, based on whether a first predicted number of iterations, predicted based on a first iteration prediction parameter of the prediction state information, provides a good prediction or a misprediction;
- determining that the first predicted number provides the good prediction when the first predicted number of iterations is equal to i_cnt, where i_cnt is the actual number of iterations;
- determining that the first predicted number provides the good prediction when the first predicted number of iterations is greater than i_cnt and less than i_cnt+N, where N is an integer and N≥1; and
- determining that the first predicted number provides the misprediction when the first predicted number of iterations is outside the range i_cnt to i_cnt+N.

20. A non-transitory computer readable storage medium to store computer-readable code for fabrication of an apparatus comprising:
- processing circuitry configured to perform processing operations in response to decoded instructions; and
- prediction circuitry configured to predict, based on prediction state information, a number of iterations of a fetching process to be performed to control fetching of data or instructions to be used in processing operations that are predicted to be performed by the processing circuitry, where the processing circuitry is capable of tolerating performing one or more unnecessary iterations of the fetching process following an over-prediction of the number of iterations;
- in response to the processing circuitry resolving an actual number of iterations of the fetching process, the prediction circuitry is configured to adjust the prediction state information used to predict the number of iterations of the fetching process, based on whether a first predicted number of iterations, predicted based on a first iteration prediction parameter of the prediction state information, provides a good prediction or a misprediction;
- the prediction circuitry is configured to determine that the first predicted number provides the good prediction when the first predicted number of iterations is equal to i_cnt, where i_cnt is the actual number of iterations;
- the prediction circuitry is configured to determine that the first predicted number provides the good prediction when the first predicted number of iterations is greater than i_cnt and less than i_cnt+N, where N is an integer and N≥1; and
- the prediction circuitry is configured to determine that the first predicted number provides the misprediction when the first predicted number of iterations is outside the range i_cnt to i_cnt+N.

* * * * *